US012790007B2

(12) United States Patent
Carle et al.

(10) Patent No.: US 12,790,007 B2
(45) Date of Patent: Nov. 10, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US); Trevor H. Wood, Clifton Park, NY (US); Kishore Ramakrishnan, Rexford, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/371,566

(22) Filed: Oct. 28, 2025

(65) Prior Publication Data

US 2026/0054842 A1 Feb. 26, 2026

Related U.S. Application Data

(63) Continuation-in-part of application No. PCT/US2024/040754, filed on Aug. 2, 2024, which is (Continued)

(51) Int. Cl.
*B64D 27/02* (2006.01)
*B64C 11/48* (2006.01)

(52) U.S. Cl.
CPC .............. *B64D 27/02* (2013.01); *B64C 11/48* (2013.01)

(58) Field of Classification Search
CPC ....... B64D 27/12; B64C 11/305; B64C 11/48; F01D 5/022
See application file for complete search history.

(56) References Cited

U.S. PATENT DOCUMENTS 2,934,150 A 4/1960 Fink
3,134,561 A 5/1964 Clejan
(Continued)

FOREIGN PATENT DOCUMENTS

CN 111435399 7/2020
EP 3683403 A1 7/2020
(Continued)

OTHER PUBLICATIONS

"Could an open fan engine cut carbon emissions for more sustainable aviation?"; https://www.airbus.com/en/newsroom/stories/2022-07-could-an-open-fan-engine-cut-carbon-emissions-for-more-sustainable; Jul. 19, 2022; 3 pgs.
(Continued)

*Primary Examiner* — Joshua J Michener
*Assistant Examiner* — Cindi M Curry
(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

13 Claims, 26 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 4,171,183 | A | 10/1979 | Cornell | |
| 4,446,696 | A | 5/1984 | Sargisson | |
| 4,486,146 | A | 12/1984 | Campion | |
| 4,765,135 | A | 8/1988 | Lardellier | |
| 4,930,725 | A | 6/1990 | Thompson | |
| 5,079,916 | A | 1/1992 | Johnson | |
| 5,135,185 | A | 8/1992 | Adamson | |
| 5,136,185 | A | 8/1992 | Fleming | |
| 5,275,531 | A | 1/1994 | Roberts | |
| 5,402,638 | A | 4/1995 | Johnson | |
| 6,017,186 | A | 1/2000 | Hoeger | |
| 6,938,854 | B2 | 9/2005 | Nelson | |
| 7,186,079 | B2 | 3/2007 | Suciu | |
| 8,714,475 | B2 | 5/2014 | Gall | |
| 8,864,062 | B2 | 10/2014 | Karem | |
| 8,967,967 | B2 | 3/2015 | Stretton | |
| 9,017,028 | B2 | 4/2015 | Fabre | |
| 9,242,721 | B2 | 1/2016 | Neuteboom | |
| 9,340,277 | B2 | 5/2016 | Breeze-Stringfellow | |
| 9,387,923 | B2 | 7/2016 | Stretton | |
| 9,464,526 | B2 | 10/2016 | Cellier | |
| 9,567,090 | B2 | 2/2017 | Gallet | |
| 9,598,981 | B2 | 3/2017 | Salunkhe | |
| 9,759,160 | B2 | 9/2017 | Sankrithi | |
| 9,776,707 | B2 | 10/2017 | Louet | |
| 10,040,559 | B2 | 8/2018 | Hoisington | |
| 10,087,885 | B2 | 10/2018 | Kohlenberg | |
| 10,202,865 | B2 | 2/2019 | Breeze-Stringfellow | |
| 10,358,926 | B2 | 7/2019 | Tweedt | |
| 10,399,664 | B2 | 9/2019 | Bowden | |
| 10,414,486 | B2 | 9/2019 | Wood | |
| 10,442,541 | B2 | 10/2019 | Miller | |
| 10,556,699 | B2 | 2/2020 | Pautis | |
| 10,584,641 | B2 | 3/2020 | Escure | |
| 10,618,633 | B1 | 4/2020 | Johnston | |
| 10,669,881 | B2 | 6/2020 | Breeze-Stringfellow | |
| 10,710,705 | B2 | 7/2020 | Tweedt | |
| 10,899,447 | B2 | 1/2021 | Hernadi | |
| 10,907,495 | B2 | 2/2021 | Breeze-Stringfellow | |
| 11,021,230 | B2 | 6/2021 | Binder | |
| 11,136,109 | B2 | 10/2021 | Wood | |
| 11,300,003 | B2 | 4/2022 | Breeze-Stringfellow | |
| 11,401,824 | B2 | 8/2022 | Breeze-Stringfellow | |
| 11,401,829 | B2 | 8/2022 | Molesini | |
| 11,572,827 | B1 | 2/2023 | Khalid | |
| 11,753,144 | B2 | 9/2023 | Tweedt | |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2011/0194932 | A1 | 8/2011 | Zanenga | |
| 2011/0259996 | A1 | 10/2011 | Vetters | |
| 2012/0119023 | A1 | 5/2012 | Moore | |
| 2017/0284303 | A1 | 10/2017 | Johnson | |
| 2018/0362170 | A1 * | 12/2018 | Stuart | B64D 27/12 |
| 2019/0185170 | A1 | 6/2019 | Schelfaut | |
| 2021/0108572 | A1 | 4/2021 | Khalid | |
| 2021/0108595 | A1 | 4/2021 | Khalid | |
| 2022/0055759 | A1 | 2/2022 | Czarnik | |
| 2023/0021836 | A1 | 1/2023 | Riddle | |
| 2024/0410319 | A1 | 12/2024 | Becoulet | |
| 2025/0018895 | A1 | 1/2025 | Howell | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Belmonte | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| EP | 2778343 | B1 | 8/2020 |
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS

Antonov An-70—Price, Specs, Photo Gallery, History—Aero Corner; https://aerocorner.com/aircraft/antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

U.S. Appl. No. 17/503,184, filed Oct. 15, 2021, Syed Arif Khalid.

U.S. Appl. No. 17/503,195, filed Oct. 15, 2021, Daniel L. Tweedt.

U.S. Appl. No. 17/665,483, filed Feb. 4, 2022, Daniel L. Tweedt.

Airbus; "A400M, Delivery to the point of need"; <https://www.airbus.com/defence/a400m.html>; available at least as early as Jul. 26, 2021.

Ibanez, Vicente, et al.; "Case Study of the Installation of the A400M Engine Control Unit"; 8th European Conference for Aeronautics and Space Sciences (EUCASS); 2019; <https://www.eucass.eu/doi/EUCASS2019-0965.pdf>; 10 pages.

Perry, Dominic; "EPI sets mid-2017 target for TP400 engine fix"; Aug. 2, 2016; Flight Global; <https://www.flightglobal.com/epi-sets-mid-2017-target-for-tp400-engine-fix/121390.article>; 2 pages.

* cited by examiner

FUSELAGE CENTERPLANE (FCP)

FUSELAGE CENTERPLANE (FCP)

FUSELAGE CENTERPLANE (FCP)

AIRCRAFT WITH AN UNDUCTED FAN PROPULSOR

CROSS-REFERENCE TO RELATED APPLICATION

This application is a continuation-in-part of International Appl. No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Figure 1:
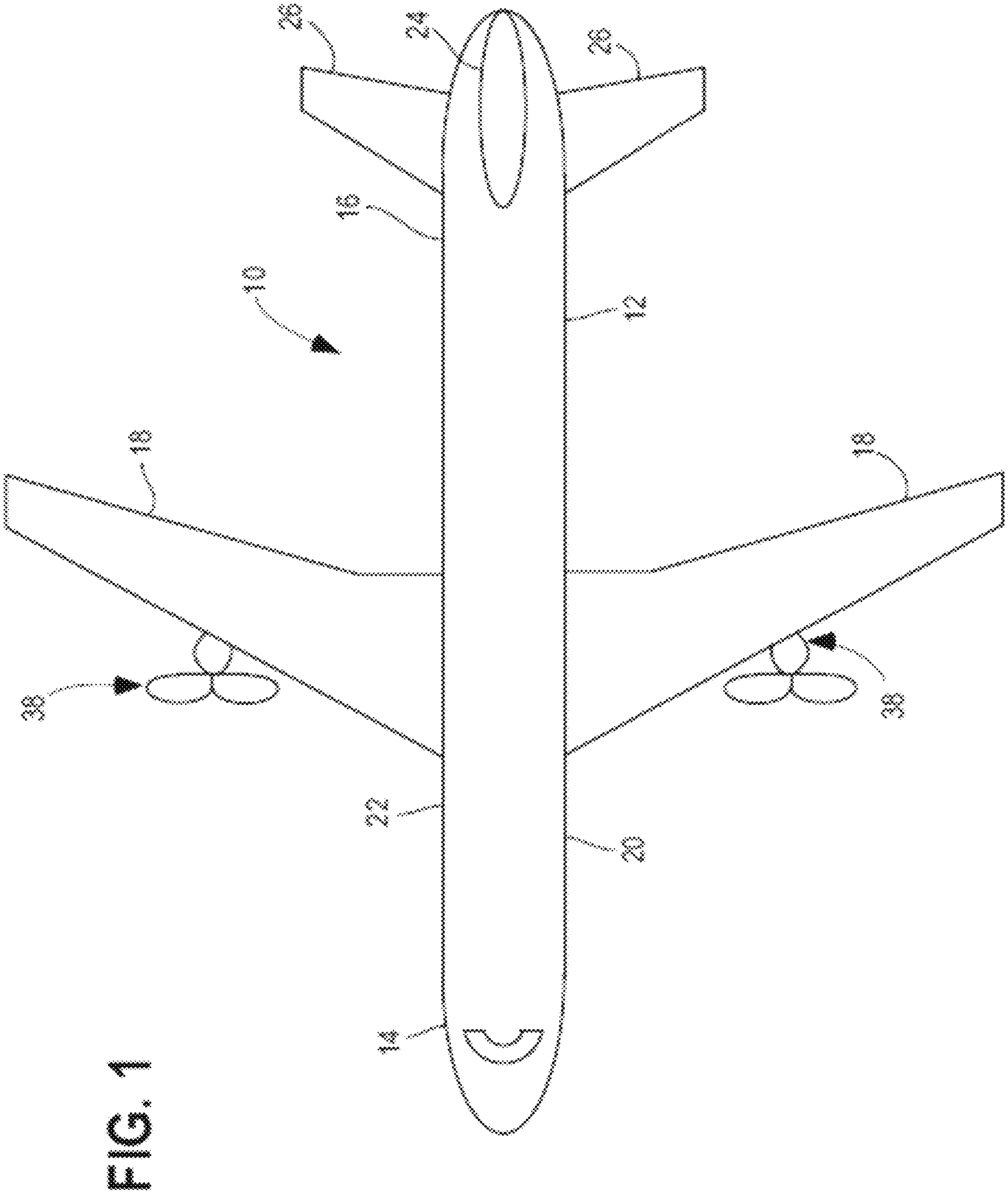
FIG. 1 comprises a top plan view of an aircraft as configured in accordance with various embodiments of these teachings, with undermounted, unducted fan propulsors mounted on forward wings of the aircraft.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

The terms "coupled", "fixed", "attached to", and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
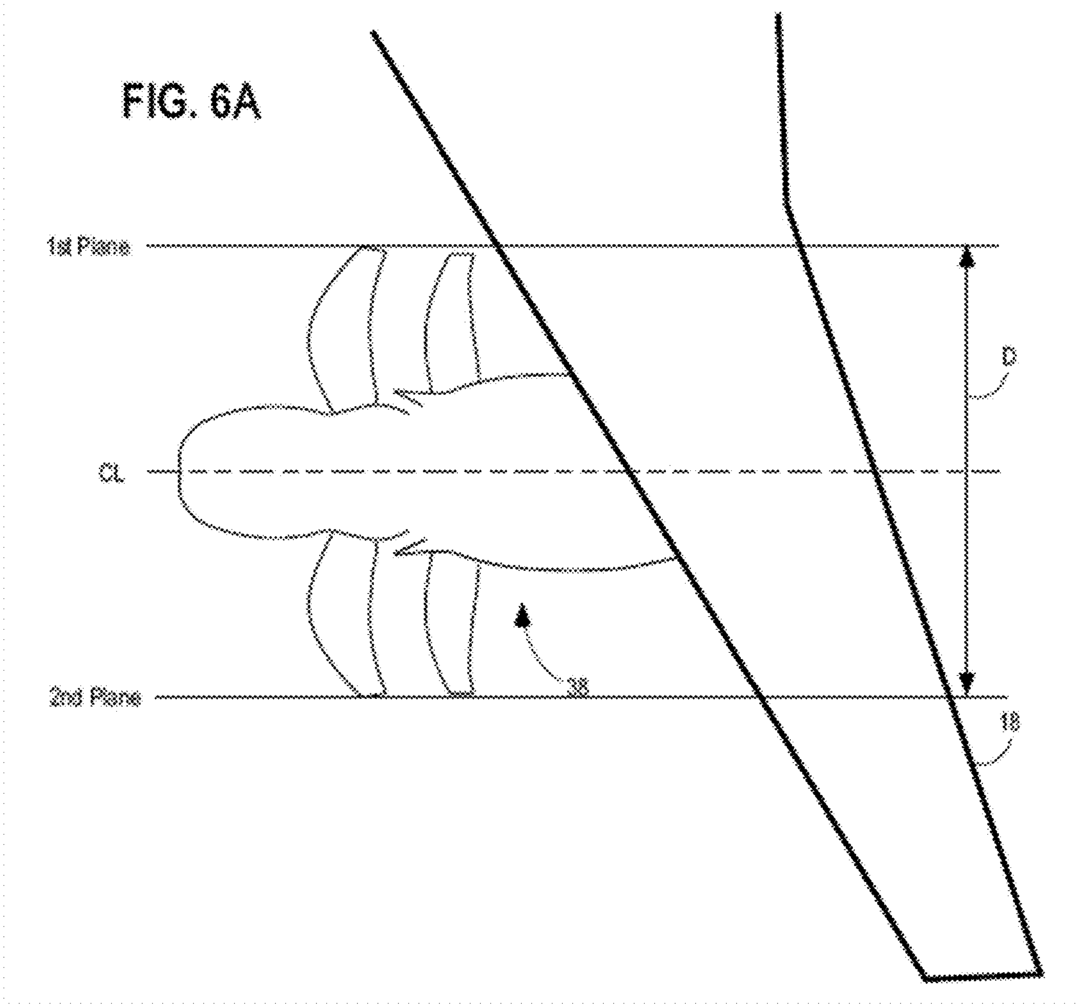
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
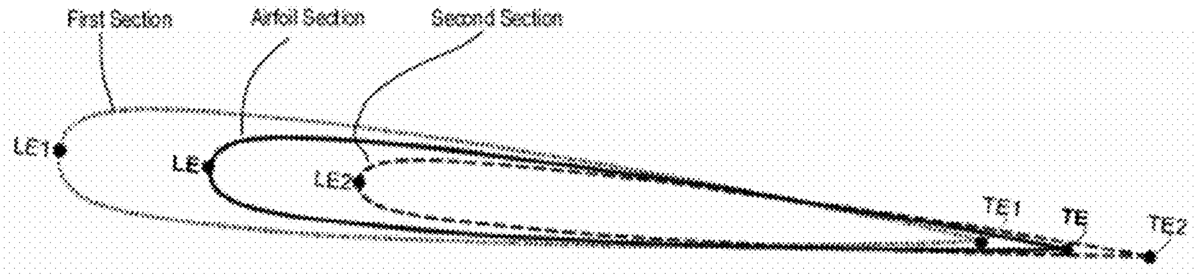
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
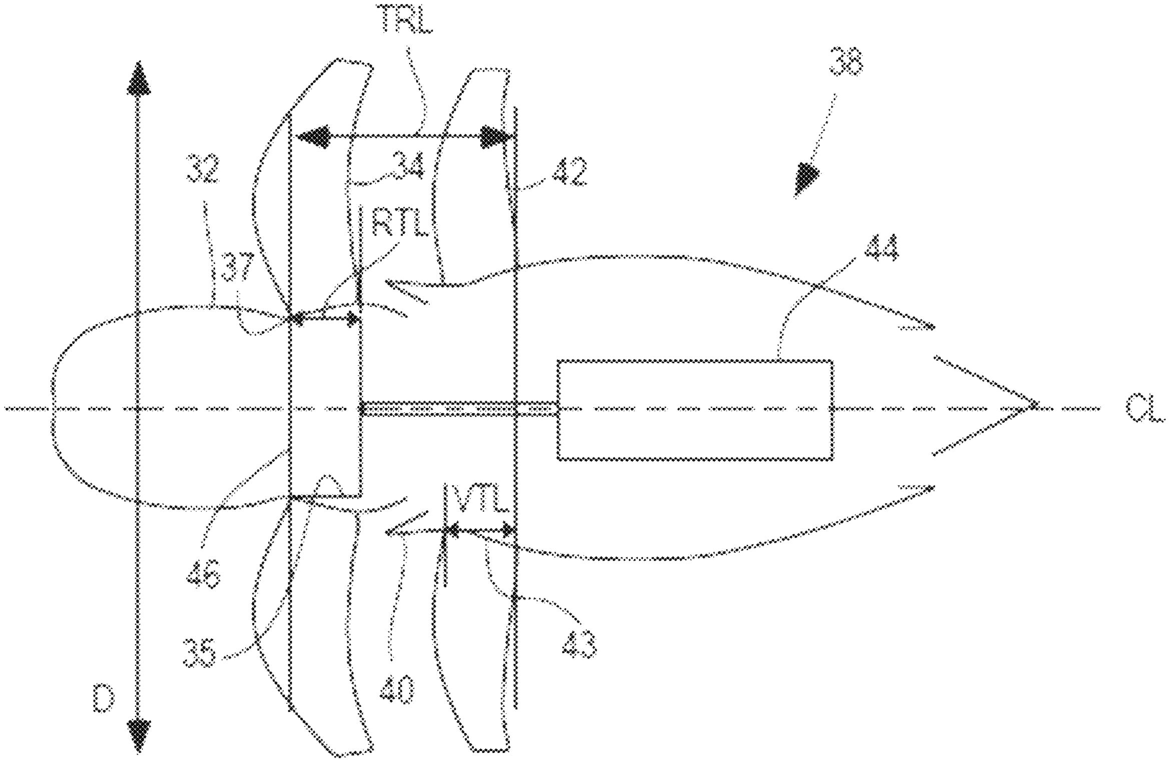
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The term "propulsive system" refers generally to a thrust-producing system, which thrust is produced by a propulsor, and the propulsor provides said thrust using an electrically-powered motor(s), a heat engine such as a turbomachine, or a combination of electric motor(s) and turbomachine.

The term "housing" refers to a casing that encloses a propulsion system and provides an aerodynamic exterior. A housing may be comprised of or include a hub, spinner and nacelle. In addition, a housing may be either rotating about the axis of rotation or stationary, or segmented axially so that a portion is rotating while another portion is stationary.

For a flowpath curve corresponding to a housing external surface, axial direction, "z", is parallel to the axis of rotation and radius, "r", is the distance from the axis of rotation. And an z-r plane is located by an angular coordinate theta (i.e., cylindrical coordinate system is adopted, where the coordinate theta precisely locates the orientation of an z-r plane in 3D space). Because the housing external surface may not be axisymmetric about the axis of rotation, the shape of the flowpath curve may depend on the z-r plane used to define it. In the specification and claims, in addition to stipulating that it includes the axis of rotation, a z-r plane used to define the flowpath curve also includes a point on a blade root within the blade assembly nearest to or associated with the housing described by the curve. Furthermore, for any axial location, z, along the curve for which a housing is rotating about the axis of rotation, rather than referring to a radius on the flowpath curve at a specified z-r position with respect to the axis of rotation, the radius, r, is an "effective" radius for a housing cross-sectional area perpendicular to the axis of rotation at that axial, z, location. Thus, for axial locations where the housing is rotating, radius, r, is the radius of a circle having the same cross-sectional area of the housing in a planar section perpendicular to the axis of rotation.

The term "bulge" refers to the location on the flowpath curve where, proceeding along the curve away from the nearest/associated blade assembly (i.e., forward of the forward blade assembly for the forward housing and the aft of the aft blade assembly for the aft housing), the radius reaches a maximum.

The term "local minimum" refers to the first location on the segment of the flowpath curve, proceeding from the bulge toward and through the axial extent of the associated blade root, where the radius stops decreasing. If the radius monotonically decreases from the bulge through the axial extent of the associated blade root, then the local minimum is at the location on the segment of the flowpath curve farthest from the bulge. Thus, the local minimum is the nearest minimum radius location to the maximum radius location that is also within the axial extent of the blade root or between the blade root and the maximum radius location. It is understood that any gaps or steps in the flowpath curve arising from connecting, mating, or relative motion between components of the housing are ignored when determining the local minimum.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine's improved position also positively influences the noise produced by the wing-engine interaction during flight at cruise conditions.

It was surprisingly found that by adapting a particular location on an unducted fan propulsor relative to an aircraft wing's effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 2:
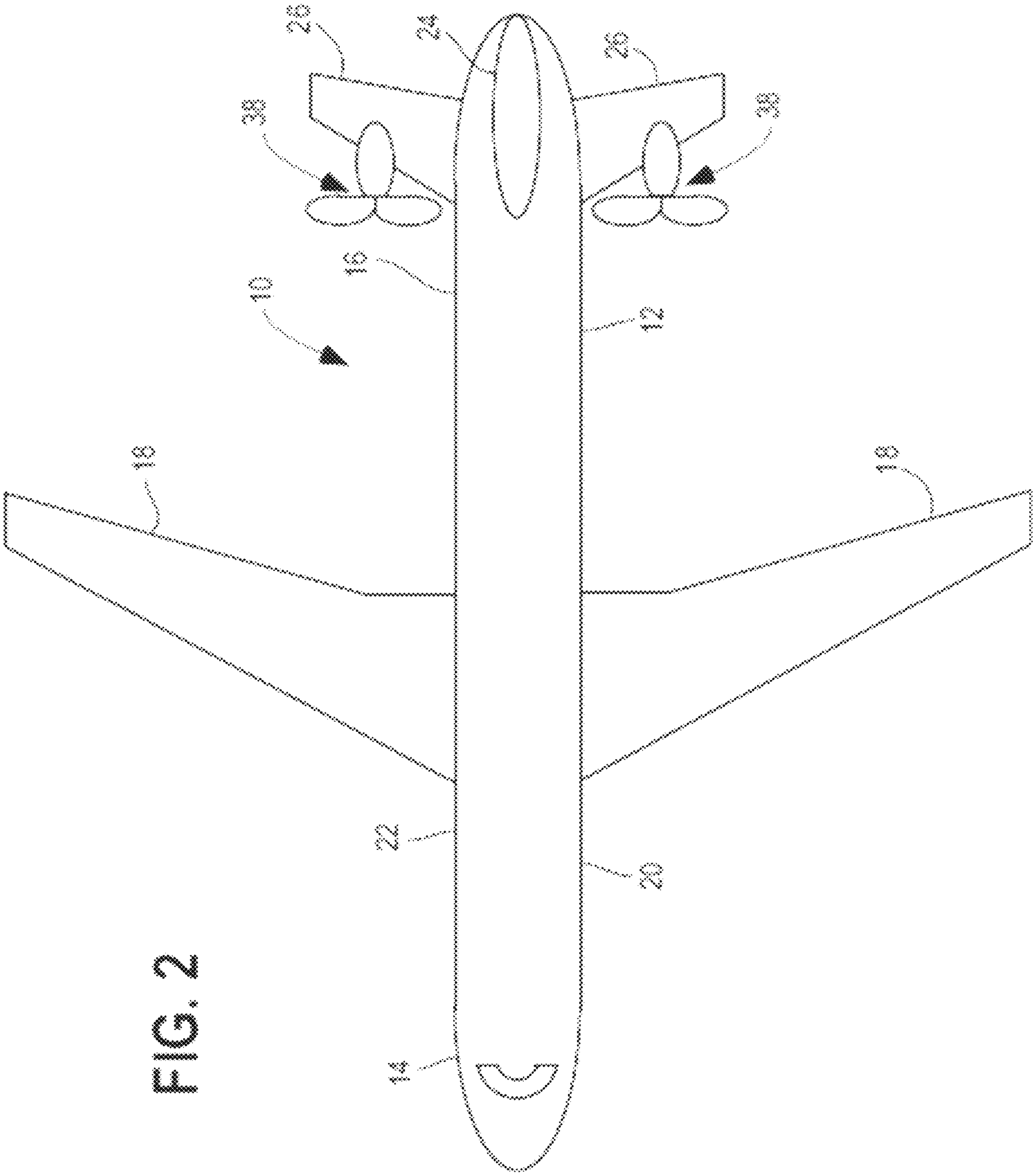
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
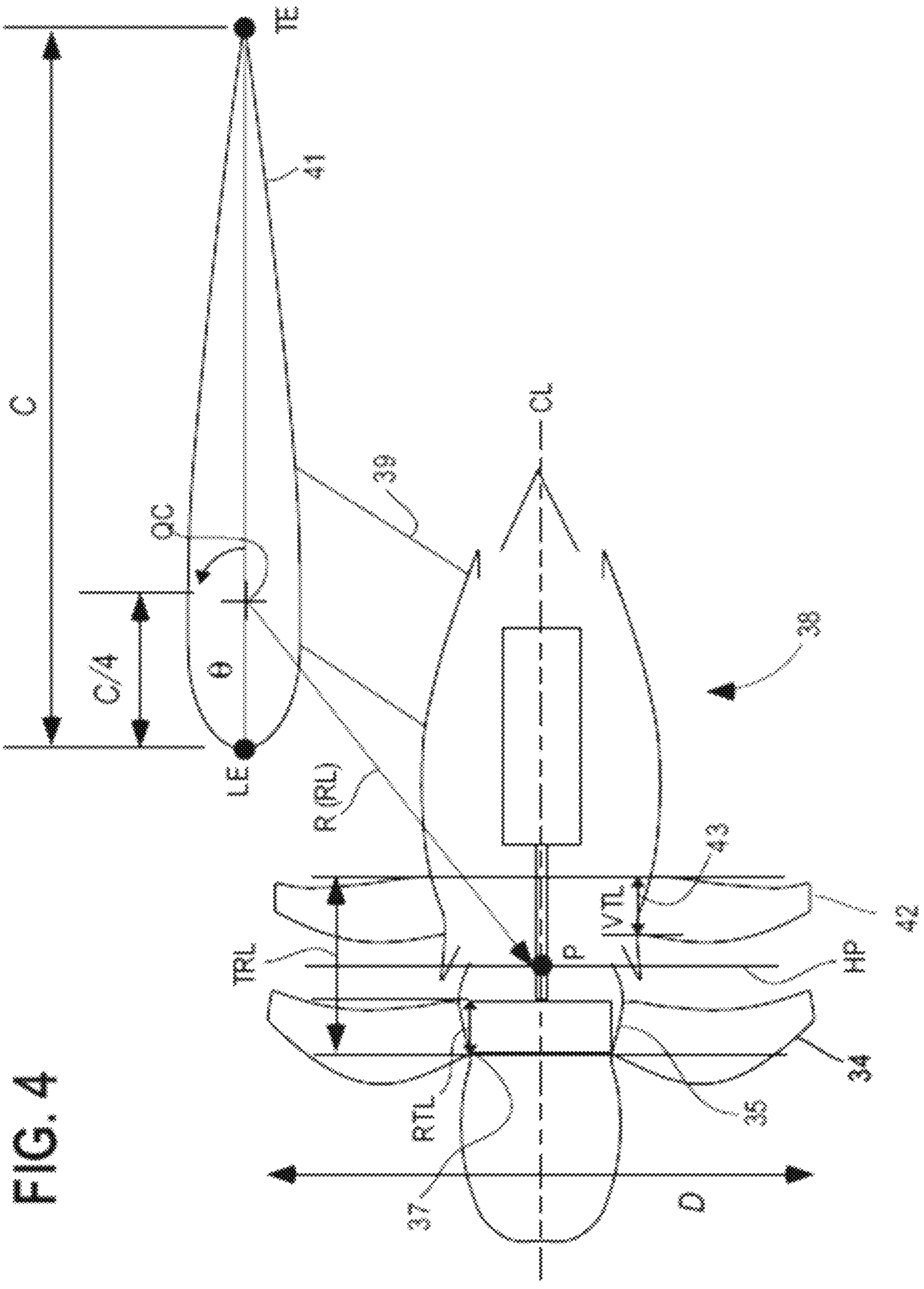
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5A:
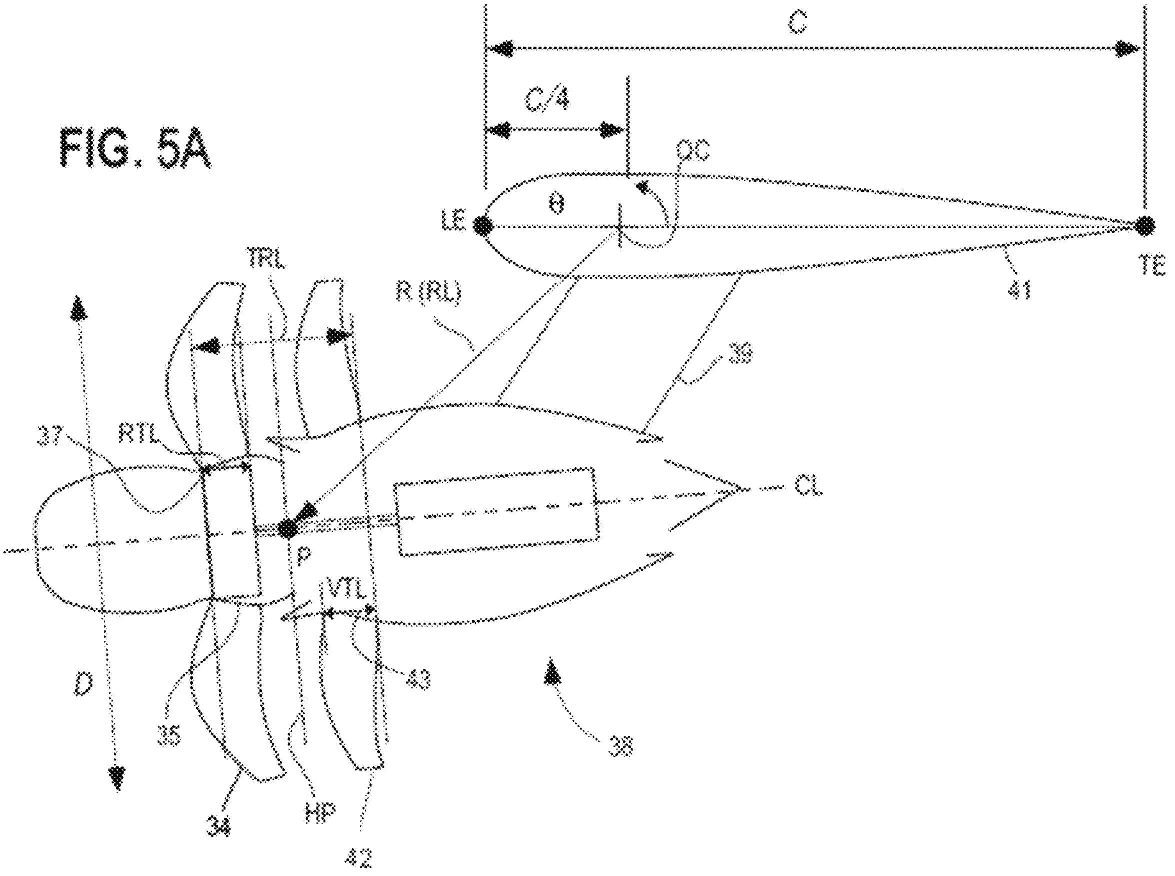
FIG. 5A is a schematic side elevation view similar to FIG. 4 and showing the unducted fan propulsor pitched downward relative to the airfoil section.
Figure 5B:
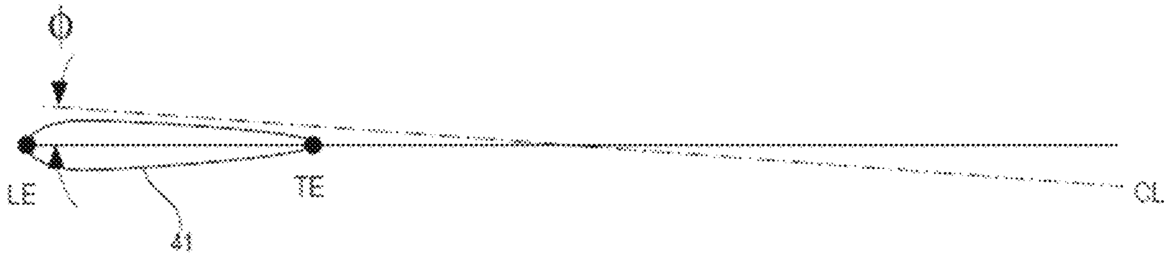
FIG. 5B defines a pitch angle Φ D for the unducted fan propulsor relative to a chord line of the airfoil section in FIG. 4.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle Φ FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
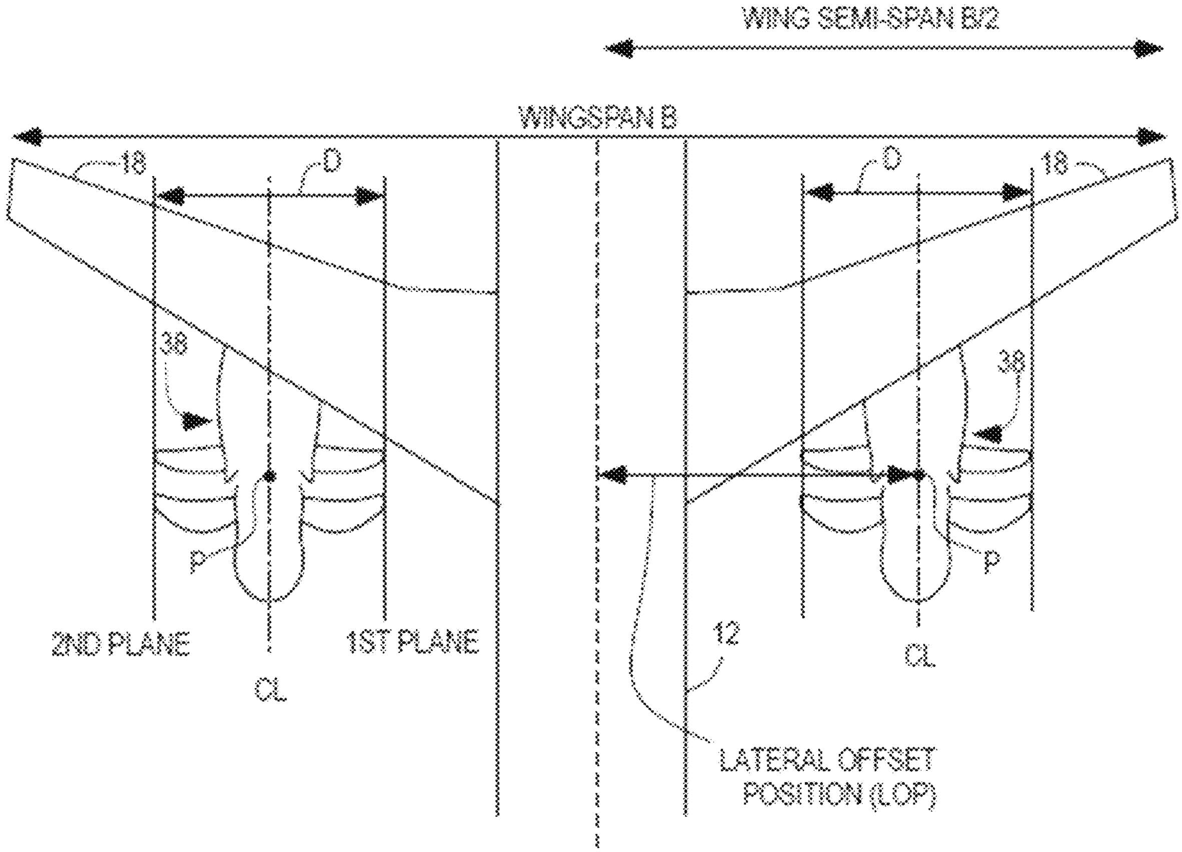
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
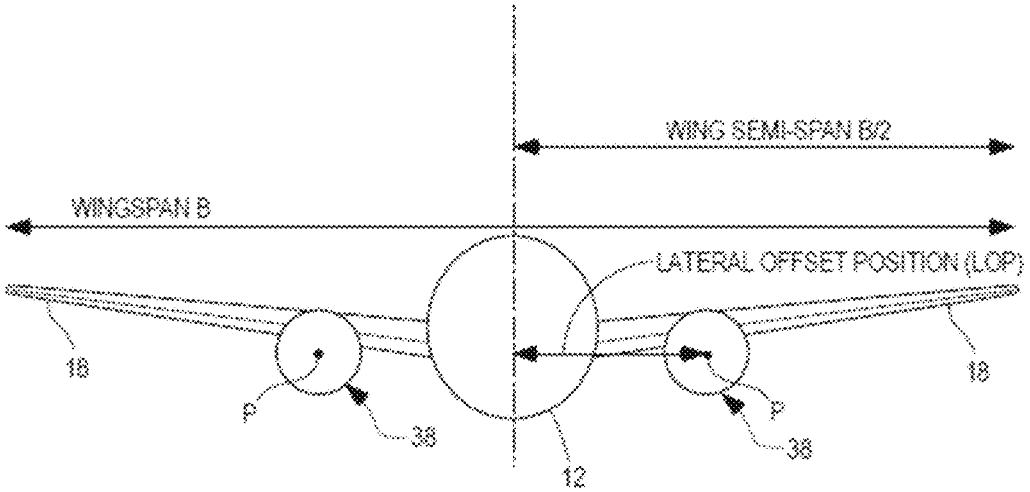
FIG. 6D comprises a schematic front elevation view of the aircraft portion of FIG. 6C.
Figure 6E:
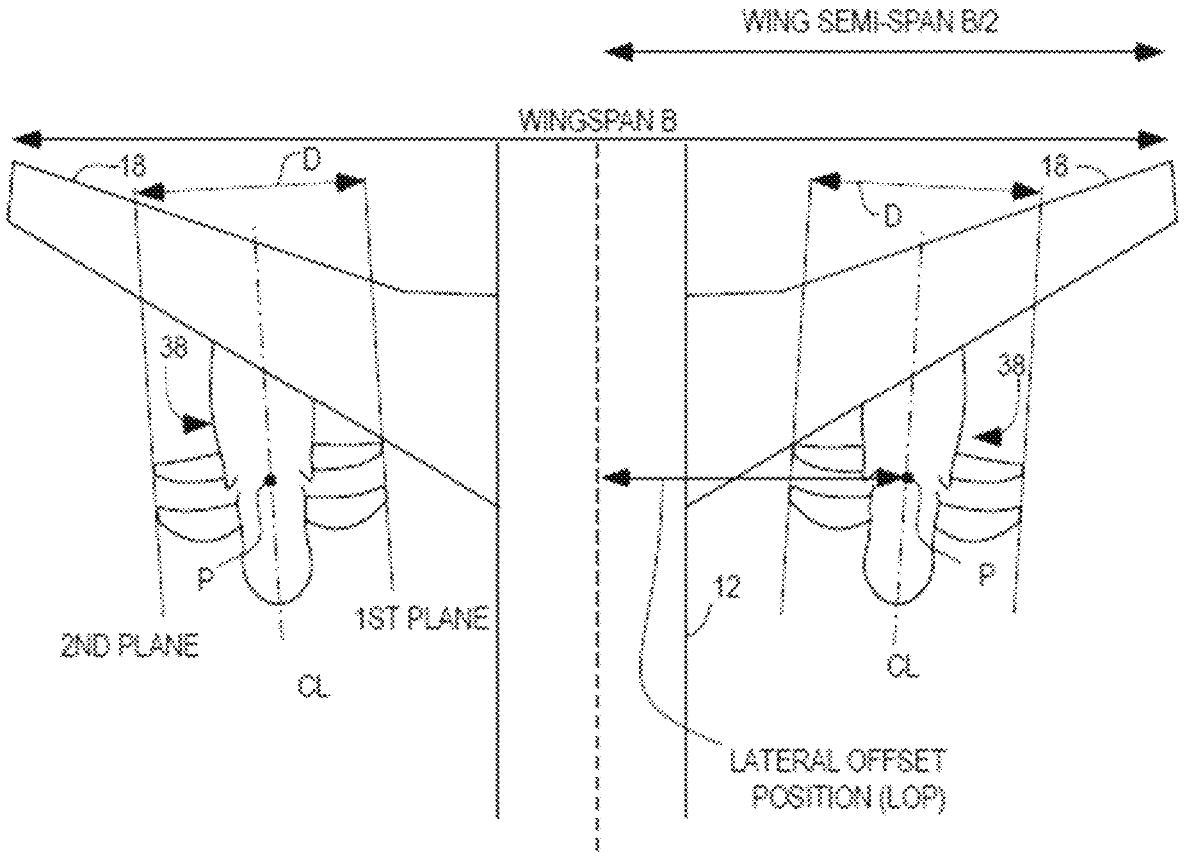
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
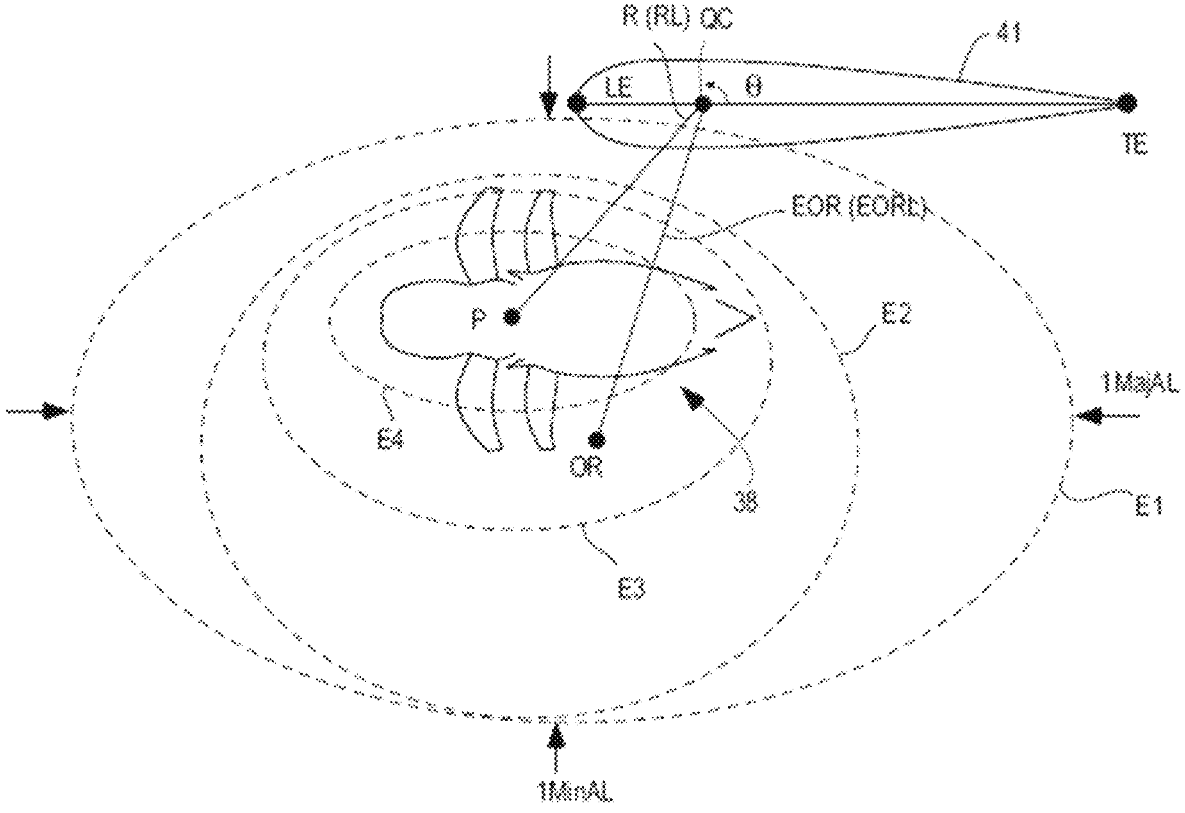
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
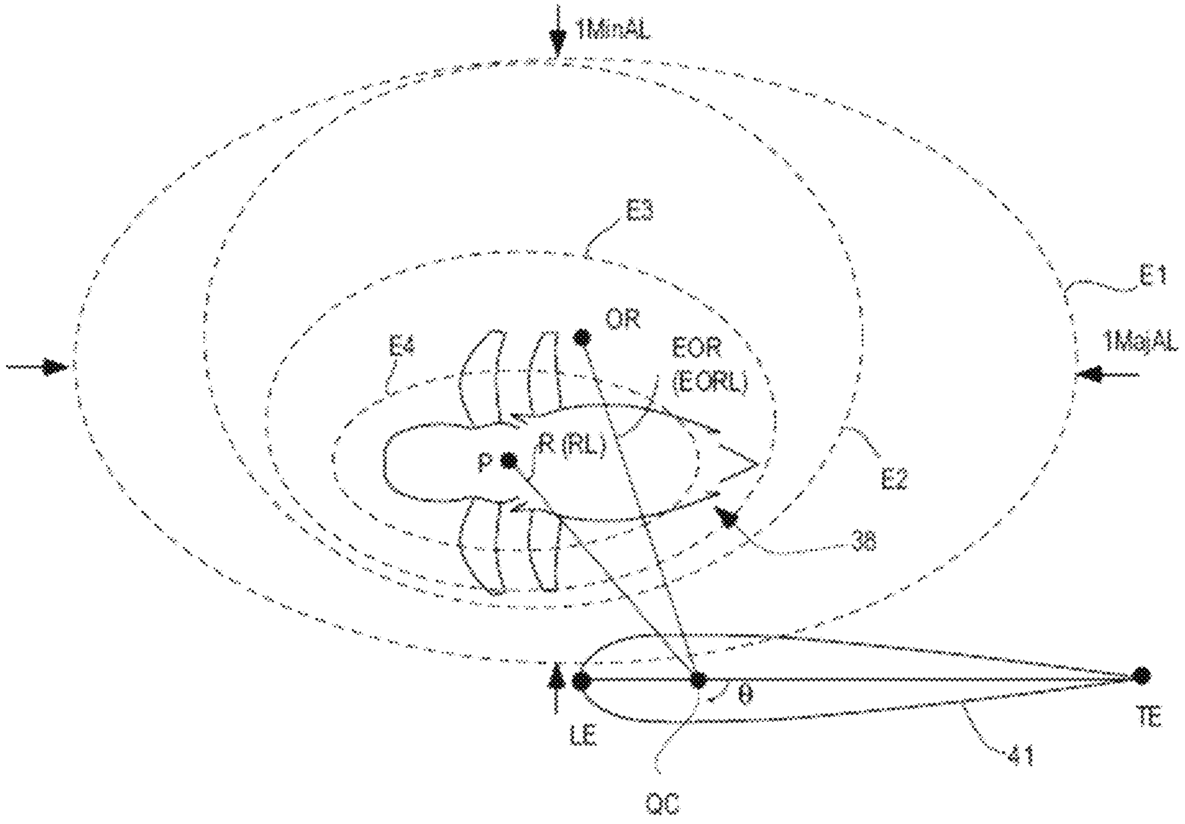
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. A unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. A unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. A unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. A unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D}+\frac{\left(\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}>0$$

and $$\frac{RL}{D}+\frac{\left(-\sqrt{a*\left[b*\sin^2(\theta)-c*\cos^2(\theta)+d*\sin(\theta)*\cos(\theta)\right]}+e*\sin(\theta)+f*\cos(\theta)\right)}{g*\sin^2(\theta)+h*\cos^2(\theta)}<0$$

where $0.07<RL/D<1.98$ and 0 is between 187° and 340°, and where a, b, c, d, e, f g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |

-continued

| Variable | Fifth Emb. | Sixth Emb. | Seventh Emb. | Eighth Emb. |
|---|---|---|---|---|
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f g and h have the values set forth in the above table under the heading "Eighth Emb."

Figure 7:
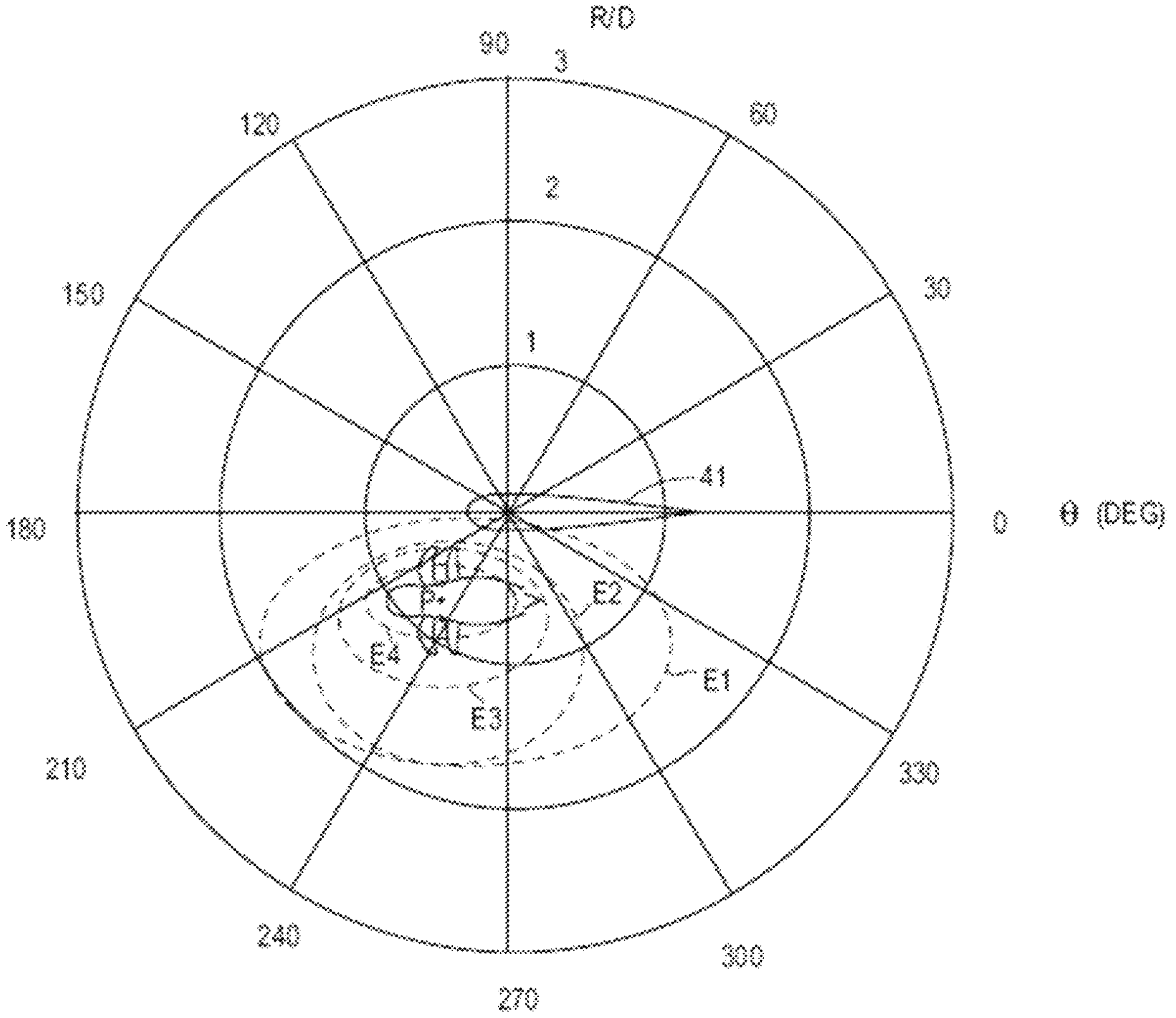
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
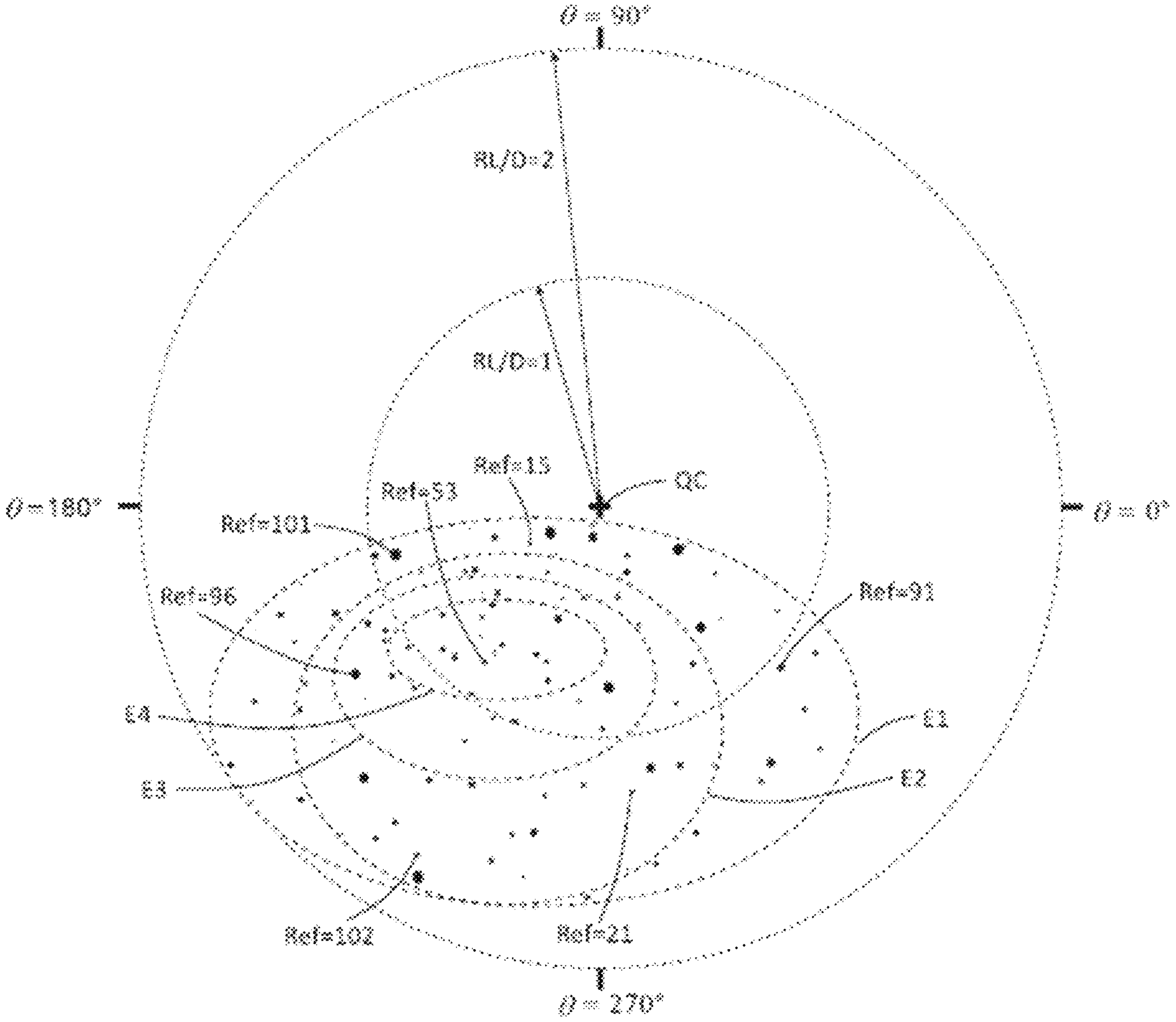
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref" refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to the effective quarter chord point (QC)

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |

TABLE 1-continued

P-location relative to the effective quarter chord point (QC)

| Ref. | Type of aircraft | RL (ft) | D (ft) | θ (deg) | RL/D |
|---|---|---|---|---|---|
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |

TABLE 1-continued

| P-location relative to the effective quarter chord point (QC) | | | | | |
|---|---|---|---|---|---|
| Ref. | Type of aircraft | RL (ft) | D (ft) | θ (deg) | RL/D |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinA L (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |

TABLE 4-continued

| Second Ellipse E2 Embodiments | | | | | | | |
|---|---|---|---|---|---|---|---|
| D (ft) | θ (deg) | EORL (ft) | 2MajAL (ft) | 2MinAL (ft) | EORL/D | 2MajAL/D | 2MinAL/D |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |

TABLE 6-continued

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
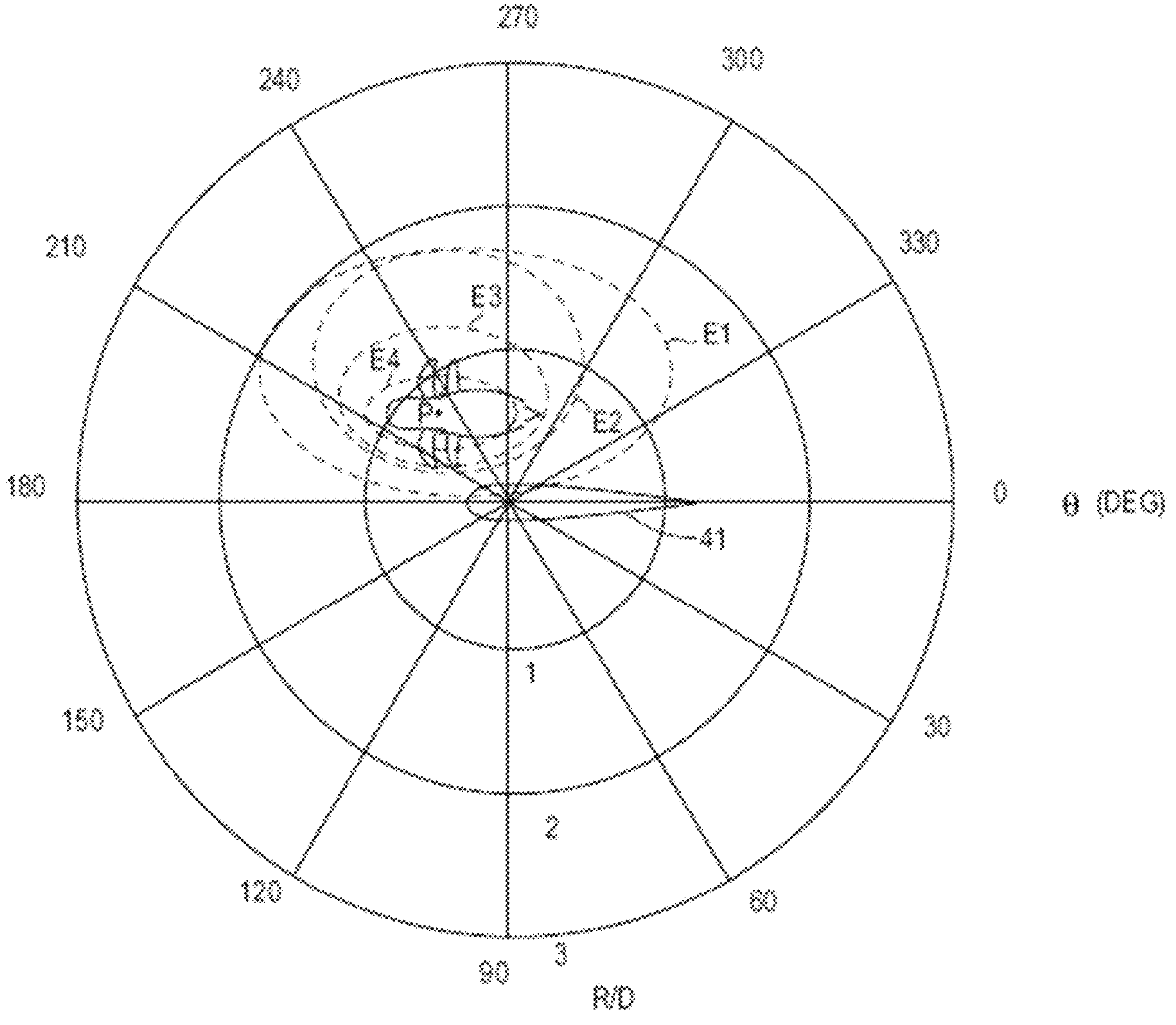
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity. However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, ρo is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

The features described above for positioning an unducted fan propulsor relative to the aircraft wing by defining a P location between external OGV or IGV and a forward or aft rotating array of fan blades, respectively, and/or defining the distance from the effective QC to P, results in improved installed performance of the unducted fan propulsor without taking into account the outside shape of the unducted fan propulsor for the installed performance. Further improvements can be made with respect to the external shape of a forward housing, also referred to as the spinner, and/or to the shape of the aft housing, also referred to as a nacelle, for an unducted fan propulsor.

As further explained below, it is desirable to provide an unducted fan propulsor with an external flowpath shape of a housing upstream of and within the axial extent of a forward blade assembly that enables the aircraft to fly at high subsonic speeds with good efficiency and with transonic flow within the fan, and/or an external flowpath shape of a housing downstream of and within the axial extent of an aft blade assembly that enables the aircraft to fly at high subsonic speeds with low loss and drag. However, an analysis of the flowpath of air during flight over the outside of the housing upstream and/or downstream of a blade assembly of an unducted fan propulsor may not provide sufficient information relating to an installed flowfield that is affected by the airframe and/or wing. Thus, when the unducted fan propulsor is installed relative to the aircraft wing, as described herein, the cruise Mach number $M_0$ used to determine the outside shape of the spinner and/or nacelle may need to be modified.

The preferred aircraft installation locations identified herein increase the static pressure surrounding the unducted propulsor such that the unducted fan behaves as if it is operating on an isolated propulsor with an ambient pressure that is higher than the ambient pressure of the aircraft. Because the relative total pressure entering the fan of the unducted propulsor is set by the ambient static pressure and the speed of the aircraft, the propulsor inflow velocity for the resulting elevated "effective ambient pressure" is lower than it would be in other installation locations or when operating in isolation (away from the aircraft). Thus, one could say that the flight Mach number $M_0$ that the propulsor responds to is "suppressed" or reduced relative to the true aircraft flight Mach number.

Considering the effects of the installed flowfield, the cruise Mach number $M_0$ may be replaced with the suppressed Mach number $M_s$ based on the equation $M_s=M_0(1-\varepsilon)$, where $0<\varepsilon\leq 0.05$. For example, an aerodynamics flow model (e.g., a Computational Fluid Dynamics (CFD) model, etc.) of the aircraft without the engine may be generated to determine the amount of flow deceleration at the intended installation location of the unducted fan propulsor. The solution of the model may then be interrogated for the suppressed Mach number $M_s$ and the parameter F may be determined by $\varepsilon=1-M_s/M_0$. Once the parameter F is determined, the suppressed Mach number $M_s$ for the installed unducted fan propulsor may be determined.

The suppressed Mach number $M_s$ may be used to refine the shaping of the spinner and/or nacelle for improved performance. The use of the suppressed Mach number $M_s$ may lead to a reduced spinner radius, a reduced nacelle radius, and/or reduced axial engine length to reduce nacelle drag beyond a nacelle drag obtainable by using the cruise Mach number $M_0$ in the analysis. As a result, by combining a bulge radius to local minimum radius ratio of greater than 1.021 for the forward housing, and/or a bulge radius to local minimum radius ratio of greater than 1.058 for the aft housing, with the features of the positioning of the propulsor relative to the aircraft wing by defining a P location between external OGV or IGV and a forward or aft rotating array of fan blades, respectively, and/or defining the distance from the effective QC to P, as described above, results in synergistic effects to improve aerodynamic performance of the aircraft, by reducing the drag experienced by the unducted fan propulsor during a cruise portion of a flight.

As explained above, the technology described herein relates to an unducted fan propulsor, also referred to herein as an unducted propulsion system, particularly the shape an external surface of one or more housings encasing a propulsion system, for which housings can be comprised of a spinner, hub and/or nacelle.

A turbofan engine operates on the principle that a central gas turbine core drives a bypass fan, the fan being located at a radial location between a fan duct and the engine core. An unducted fan propulsor instead operates on the principle of having the bypass fan located outside of the engine nacelle. This permits the use of larger fan blades able to act upon a larger volume of air than for a turbofan engine, and thereby improves propulsive efficiency over conventional engine designs.

Unducted fan propulsors may take the form of a propeller system, as used on a wide range of aircraft, e.g., radio controlled model airplanes, drones, piston engine propeller aircraft, turboprop regional aircraft, and large turboprop military transports. Another type of unducted fan propulsor, sometimes referred to as "open rotor", consists of two blade assemblies, one in a forward position and one in an aft position, in which at least one of them rotates about an axis to deliver power to the propulsive stream that generates thrust. Such two blade assembly systems offer some advantages, but also some challenges and are far less common than single blade row systems. As used herein, the term "propeller" may refer to the single blade assembly of an unducted fan propulsor or the forward blade assembly of an unducted fan propulsor comprised of two blade assemblies. The term "fan" may refer to the either a propeller or both blade assemblies of an unducted fan propulsor.

According to the disclosure, an unducted fan propulsor can enable high subsonic cruise flight speed. Cruise is a phase of the flight that occurs when the aircraft levels to a set altitude after a climb and before it begins to descend. Thus, as used herein, cruise represents a continuous, high speed, and stable condition of flight for which an aircraft is intended to operate. This description is to distinguish cruise from certain conditions that are abnormal or transient, such as dive, in which the aircraft can reach high flight speeds, but the aircraft is not intended to experience for a substantial portion of the mission from takeoff to landing.

An unducted fan propulsor that enables highest subsonic cruise flight can have two blade assemblies positioned in aerodynamic relationship to one another. As used herein "aerodynamic relationship" means they are positioned such that one is downstream of the other so at least a portion of the air acted upon by the forward blade assembly is subsequently acted upon by the aft blade assembly, also referred to herein as a rearward blade assembly. This allows the tangential velocity, also known as swirl, imparted to the air by the forward blade assembly to be counteracted, i.e., at least partially canceled, by the change in tangential velocity imparted by the aft blade assembly. At least one of the blade assemblies is a rotating assembly carrying an array of airfoil blades that rotate about an axis of rotation and are located outside the engine nacelle. The other blade assembly may be another rotating blade assembly (rotor) or it may be a stationary blade assembly (stator). Without the aft blade assembly to cancel the swirl of the forward blade assembly, the high power per unit frontal or annular fan area required for high speed flight would leave excessive swirl in the air that passes through the unducted fan propulsor, resulting in poor efficiency in producing thrust. For this reason, single propeller propulsion systems, such as propellers on turboprop engines, typically power aircraft that do not exceed a cruise Mach number of 0.72.

If the unducted fan propulsor is comprised of two blade assemblies that are both rotors, the blades of the forward and aft blade assemblies are arranged to rotate about a common axis in opposing directions and are axially spaced apart along that axis. For example, the respective blades of the forward rotor assembly and aft rotor assembly may be co-axially mounted and spaced apart, with the blades of the forward rotor assembly configured to rotate clockwise about the axis and the blades of the aft rotor assembly configured to rotate counter-clockwise about the axis (or vice versa).

If one of the two blade assemblies is a stator, this blade assembly does not rotate about an axis and is placed either aerodynamically upstream or downstream of the rotating blade assembly, being the forward or aft blade assembly, respectively. If placed aerodynamically upstream of the rotating blade assembly, the stationary blade assembly imparts tangential velocity to the air in the direction opposite to the direction of rotor rotation, referred to as counter-swirl. Because of the direction of rotation, the aft rotating blade assembly imparts a change in tangential velocity to the air to reduce the magnitude of the tangential velocity of the air that passes through it. If positioned aerodynamically downstream of the rotating blade assembly, the stationary blade assembly imparts a change in tangential velocity that is opposite to the direction of tangential velocity imparted by the rotor, referred to as de-swirl. By de-swirling the air that it receives from the rotating blade assembly, the aft blade assembly reduces the magnitude of the tangential velocity of the air that passes through it. The blades in a stator are often referred to as "vanes". However, the general term "blade" and "blade assembly" are used herein to be used in either a rotating blade assembly or stationary blade assembly.

For a stationary blade assembly, the aircraft structure may be intermingled, integrated, or merged with the blade assembly. For example, the pylon used to mount an engine to an aircraft may occupy some of the same axial extent along the rotating blade assembly axis of rotation as at least some of the blades in the stationary blade assembly. Also, portions of the aircraft structure may be designed to serve the purpose of counter-swirl for a forward blade assembly or de-swirl for an aft blade assembly. Thus, aircraft structures may augment or even replace some blades in a stationary blade assembly.

As used herein, the locations or coordinates indicated by distance parallel to the axis of rotation and perpendicular to the axis of rotation define the external flowpath surfaces of the indicated structure. The external flowpath surfaces work with the blade assemblies to affect the flow of the working fluid, typically air, through the fan. The external flowpath surfaces formed by one or more housings separate the air stream accelerated by the fan from internal mechanisms, machinery, or equipment associated with the propulsion system. As the flight Mach number and acceleration of air through the fan increase, the shapes of these external flowpath surfaces become increasingly important to avoid high pressure loss or drag. In addition, these external flowpath surfaces may bulge, i.e., increase in size, axially away from the vicinity of the blade assembly to accommodate above-mentioned internal items.

For an unducted fan propulsor, high speed flight requires even higher velocity through the fan and over the flowpath surfaces formed by the one or more housings. As used herein, "fan stream" is the fluid stream accelerated by the fan to produce thrust. Such velocities may reach or exceed the speed of sound, or Mach 1. Under certain conditions, high Mach flows generate dramatic increases in pressure loss and drag, penalizing the thrust producing performance, or efficiency, of the system. This may lead to poor fuel efficiency. Also, it may be desirable to limit the diameter of the fan to avoid penalties associated with weight, drag, and installation on an aircraft. However, a compact fan results in high thrust per unit frontal, or annular, area of the fan and, thus, higher acceleration than if the fan diameter were not so constrained. Furthermore, axial length of the system, and thus, the length of the flowpath surfaces that bound the fan stream, contributes to drag and weight. At the same time, reducing the axial length can also penalize performance of the unducted fan propulsor by causing high magnitudes of flowpath surface curvatures, resulting in regions of high Mach number. Accordingly, it is desirable to provide an unducted fan propulsor with an external flowpath shape of a housing upstream of and within the axial extent of a forward blade assembly that enables the aircraft to fly at high subsonic speeds with good efficiency and with transonic flow within the fan. It is also desired to provide an unducted fan propulsor with an external flowpath shape of a housing downstream of and within the axial extent of an aft blade assembly that enables the aircraft to fly at high subsonic speeds with low loss and drag.

As stated above, the cruise Mach number $M_0$ may be replaced with the suppressed Mach number $M_s$ based on the equation $M_s=M_0(1-\varepsilon)$, where $0<\varepsilon\leq 0.05$, for the purposes of analyzing the flowfield for an installed unducted fan propulsor that takes into account the effects of the airframe and the wing. According to the disclosure, an unducted fan propulsor for a subsonic aircraft having a suppressed Mach number, $M_s$, 0.70 or greater, for example, $0.70<M_s<0.86$ or between suppressed Mach number 0.74 and 0.84, has of an axis of rotation, a forward blade assembly, an aft blade assembly, a forward housing, and an aft housing. The forward and aft blade assemblies each include a plurality of blades, each blade having a root proximal to the axis of rotation and a tip distal from the axis of rotation. A flowpath curve corresponds to the intersection of the aft housing external surface with a plane containing the axis of rotation and the aft-most point of an aft blade root. For the flowpath curve, axial direction, z, is parallel to the axis of rotation, increasing in the aft or downstream direction. For the flowpath curve, radial coordinate, r, is distance from the axis of rotation.

The flowpath curve has a bulge and local minimum. The bulge location with radius $r_b$ is found by proceeding aft from the aft-most point of an aft blade root to where the radius reaches a maximum. The local minimum location with radius $r_h$ is found by proceeding axially forward from the bulge to where the radius stops decreasing. The flowpath curve has ratio $r_b/r_h>1.058$. Furthermore, the axial distance $z_b$ between the bulge and the local minimum may conform to the ratio $z_b/r_h<2.41$. Additionally, the flowpath curve may have a location with radius $r_m$ axially halfway between the bulge and the local minimum such that $(r_m/r_h-1)/(r_b/r_h-1)>0.59$. The above ratios may be tailored to suit a predetermined suppressed Mach number, $M_s$, as shown in EQS. 1, 2, and 3 presented sequentially below:

$$\frac{r_b}{r_h} = (A1-1)\frac{M_s-0.60}{0.19}+1 \quad \text{[EQ. 1]}$$

$$\frac{z_b}{r_h} = B1\left(\frac{M_s}{0.79}\right)^3 \quad \text{[EQ. 2]}$$

$$\frac{r_m/r_h-1}{r_b/r_h-1} = C1 \quad \text{[EQ. 3]}$$

In the above equations, $0.70<M_s<0.86$, and constants A1, B1, and C1 have ranges $1.11<A1<1.31$, $1.23<B1<1.63$, and $0.59<C1<0.79$. The above relationships for a flowpath curve corresponding to an aft blade root may apply to flowpath curves associated with multiple aft blade roots, or the flowpath curves associated with all aft blade roots.

According to the disclosure, an unducted fan propulsor for a subsonic aircraft having a suppressed Mach number, $M_s$, 0.70 or greater, for example $0.70<M_s<0.86$, has an axis of rotation, a forward blade assembly, an aft blade assembly, a forward housing, and an aft housing. The forward and aft blade assemblies each include a plurality of blades, each blade having a root proximal to the axis of rotation and a tip distal from the axis of rotation. A flowpath curve corresponds to the intersection of the forward housing external surface with a plane containing the axis of rotation and the forward-most point of a forward blade root. For the flowpath curve, axial direction, z, is parallel to the axis of rotation, increasing in the forward or upstream direction. For the flowpath curve, radius, r, is distance from the axis of rotation. At axial locations where the forward housing is rotating about the axis of rotation (e.g., a spinner), radius, r, is an effective radius, i.e., the radius of a circle having the same cross-sectional area of the forward housing perpendicular to the axis of rotation.

The flowpath curve has a bulge and a local minimum. The bulge with radius $r_1$ is found by proceeding forward from the forward-most point of the forward blade root to where the radius reaches a maximum. The local minimum location with radius $r_2$ is found by proceeding aft from the bulge to where the radius stops decreasing within the axial extent of the forward blade root. The flowpath curve has ratio $r_1/r_2>1.021$. Furthermore, the axial distance $z_1$ between the bulge and local minimum may conform to the ratio $z_1/r_2<1.522$. Additionally, the forward housing may have a forward-most point wherein the axial distance $z_2$ between the local minimum and the forward-most end of the flowpath curve may conform to the ratio $z_2/r_2<4.115$. The above ratios may be tailored to suit a predetermined suppressed Mach number, $M_s$, as shown in EQS. 4, 5, and 6 presented sequentially below:

$$\frac{r_1}{r_2} = (A2-1)\frac{M_s-0.60}{0.19}+1 \quad \text{[EQ. 4]}$$

$$\frac{z_1}{r_2} = B2\left(\frac{M_s}{0.79}\right)^3 \quad \text{[EQ. 5]}$$

$$\frac{z_2}{r_2} = C2\left(\frac{M_s}{0.79}\right)^3 \quad \text{[EQ. 6]}$$

where, $0.70<M_s<0.86$, $1.04<A2<1.14$, $0.78<B2<1.18$, and $2.19<C2<3.19$.

Also according to the disclosure, an unducted fan propulsor for a subsonic aircraft having a suppressed Mach number, $M_s$, 0.70 or greater, for example $0.70<M_s<0.86$, includes a rotating element comprised of an axis of rotation, a forward blade assembly, and a forward housing. The forward housing, or spinner, rotates with the forward blade assembly about the axis of rotation. The forward blade assembly includes a plurality of blades, each blade having a root proximal to the axis of rotation and a tip distal from the axis of rotation. The axial direction, z, for the spinner is parallel to the axis of rotation, increasing in the forward or upstream direction. The radius, r, of the spinner shape is the distance from the axis of rotation. Radial coordinate, r, is an effective radius, i.e., a radius of a circle having the same cross-sectional area of the spinner perpendicular to the axis of rotation. The spinner has a bulge location with radius $r_1$ at a maximum radius forward of the forward blade assembly. Proceeding axially aft from the bulge, the spinner has a local minimum with radius $r_2$ where the radius stops decreasing within the axial extent of the forward blade roots. The spinner is shaped such that ratio $r_1/r_2>1.047$. Furthermore, the axial distance $z_1$ between the bulge and local minimum may conform to the ratio $z_1/r_2<1.522$. Additionally, the forward housing may have a forward-most point wherein the axial distance $z_2$ between the local minimum and the forward-most end of the flowpath curve may conform to the ratio $z_2/r_2<4.115$. The above ratios may be tailored to suit a predetermined suppressed Mach number, $M_s$, using EQS. 4, 5, and 6, where $0.70<M_s<0.86$, $1.09<A2<1.14$, $0.78<B2<1.18$, and $2.19<C2<3.19$ These and other features, aspects and advantages of the present disclosure and/or embodiments will become better understood with reference to the following description and appended claims. The accompanying drawings, which are incorporated in and constitute a part of this specification illustrate embodiments of the present disclosure and, together with the description, serve to explain the principles of the present disclosure.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In the Figures which follow, like reference numerals are utilized to refer to like elements throughout the various embodiments depicted in the Figures.

Figure 12:
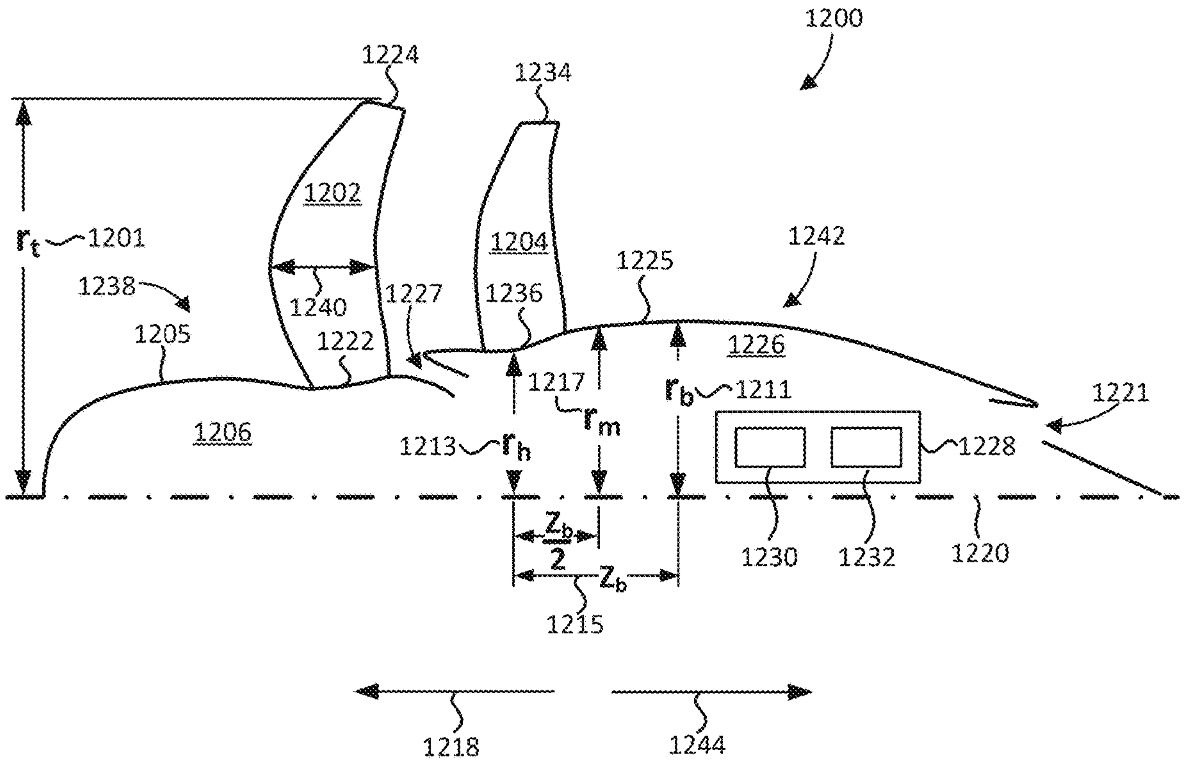
FIG. 12 shows an elevational cross-sectional view of an exemplary unducted fan propulsor having an axis of rotation, forward and aft blade assemblies, forward and aft housings, engine inlet and engine exit, in accordance with some embodiments.

FIG. 12 shows an elevational cross-sectional view of an exemplary unducted fan propulsor 1200. As is seen from FIG. 12, the unducted fan propulsor 1200 takes the form of an open rotor propulsion system and has a rotating element 1238 depicted as a propeller assembly which includes an array of blades 1202 affixed to forward housing 1206 and configured to rotate around an axis of rotation 1220 of the unducted fan propulsor 1200. The unducted fan propulsor 1200 also includes in the exemplary embodiment a non-rotating stationary element 1242 which includes an array of blades 1204, also known as vanes, disposed around axis of rotation 1220. These blades may be arranged such that they are not all equidistant from the propeller. These blades are mounted to a stationary frame and do not rotate relative to the central axis 1220. The non-rotating stationary element 1242 includes a stationary aft housing 1226. Forward housing 1206 and aft housing 1226 have external surfaces that are three-dimensional. To explain the surface shaping guidance disclosed herein, parameters are defined along flowpath curves that correspond to intersecting the external surfaces with a plane that includes the axis of rotation. Accordingly, flowpath curve 1205 corresponds to the intersection of forward housing 1206 with an z-r plane that includes the axis of rotation. Similarly, the flowpath curve 1225 corresponds to the intersection of aft housing 1226 with an z-r plane that includes the axis of rotation. For reference purposes, FIG. 12 also depicts a forward direction denoted with arrow 1218.

As shown in FIG. 12, the exemplary unducted fan propulsor 1200 also includes a drive mechanism 1228 which provides torque and power to the rotating element 1238 through a transmission (not shown). In various embodiments, the drive mechanism 1228, also known as an engine, may be a gas turbine engine, an electric motor, an internal combustion engine, or any other suitable source of torque and power and may be located in proximity to the rotating element 1238 or may be remotely located with a suitably configured transmission. Transmission transfers power and torque from the drive mechanism 1228 to the rotating element 1238 and may include one or more shafts, gearboxes, or other mechanical or fluid drive systems. In FIG. 12, drive mechanism 1228 is depicted schematically as comprising a gas generator 1230 and a power turbine 1232. An example of a turbomachine comprising a gas generator (e.g., compressor, combustor & high-speed turbine) and power turbine of a gas turbine engine is shown and described in US20210108597, hereby incorporated by reference in its entirety for all purposes. Alternative configurations to the one illustrated in FIG. 12 herein are depicted in U.S. Ser. No. 10/704,410, U.S. Pat. Nos. 5,190,441, 9,340,277, and U.S. Ser. No. 10/358,926, hereby each incorporated by reference in their entirety for all purposes.

Airfoil blades 1202 of rotating element 1238 are sized, shaped, and configured to produce thrust by moving a working fluid such as air in a direction 1244 as shown in FIG. 12 when the rotating element 1238 is rotated in a given direction around the axis of rotation 1220. In doing so, blades 1202 impart a degree of swirl to the fluid as it travels in the direction 1244. Blades 1204 of the stationary element are sized, shaped, and configured to decrease the swirl magnitude of the fluid, so as to increase the kinetic energy that generates thrust for a given shaft power input to the rotating element. Each rotating blade 1202 has blade root 1222 and blade tip 1224. Each stationary blade 1204 has a blade root 1236 and blade tip 1234. For both rotating blades 1202 and stationary blades 1204, span is defined as the distance between root and tip. Stationary blades 1204 may have a shorter span than rotating blades 1202, for example, 50% of the span of blades 1202, or may have longer span or the same span as blades 1202 as desired. In FIG. 12, stationary blades 1204 are shown affixed to the housing 1226 at their respective blade roots 1236. In some embodiments some or all stationary blades 1204 may be affixed to, or integrated with, the aircraft structure, such as a wing, pylon, or fuselage. The number of blades 1204 of the stationary element may be fewer or greater than, or the same as, the number of blades 1202 of the rotating element and is typically greater than two, or greater than four. In some embodiments a ratio of the number of rotating blades 1202 to a number of stationary blades 1204 is between 2:5 and 2:1. In some embodiments a difference between the number of rotating blades 1202 to a number of stationary blades 1204 is between 2 and −2.

Blades 1204 of the stationary element 1242 may be positioned aerodynamically upstream of the rotating blades 1202 to serve as counter swirl vanes, i.e., imparting a tangential velocity which is opposite to the rotation direction of the rotating element 1238. Alternatively, and as shown in FIG. 12, stationary blades 1204 may be positioned aerodynamically downstream of the rotating blades 1202 to serve as de-swirl vanes, i.e., imparting a change in tangential velocity which is counter to that of the rotating element 1238. Any swirl remaining in the airstream downstream of the unducted fan propulsor 1200 equates to a loss in thrust producing kinetic energy.

It may be desirable that either or both of the sets of rotating blades 1202 and stationary blades 1204 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

An inlet 1227 is located axially between the blades 1204 and blades 1202. Alternatively, the inlet 1227 may be located elsewhere, for example, forward of the blades 1202. A ratio of a mass of air accelerated by the rotating blades 1202 and bypassing the inlet 1227 to the mass of air accelerated by the rotating blades and entering the engine core (not shown) via the inlet 1227 is known as the bypass ratio. In some embodiments, a ratio of the sweep area of the blades (computed as $\pi\times[(\text{blade tip radius})^2-(\text{blade root radius})^2)$ to the cross-sectional area of the inlet (as measured in a z-r plane) is greater than 20:1 or greater than 30:1, and less than 80:1.

It will be appreciated that the exemplary unducted fan propulsor 1200 depicted in FIG. 12 is by way of example only. In other exemplary embodiments, it may have other suitable configurations. For example, instead of being a forward rotating blade assembly and an aft stationary blade assembly as shown, the two blade assemblies could be counter-rotating with respect to one another. As another example, the forward blade assembly could be stationary and the aft blade assembly could be rotating. As another example, the unducted fan propulsor may consist of only a rotating blade assembly, i.e., a propeller.

Figure 13:
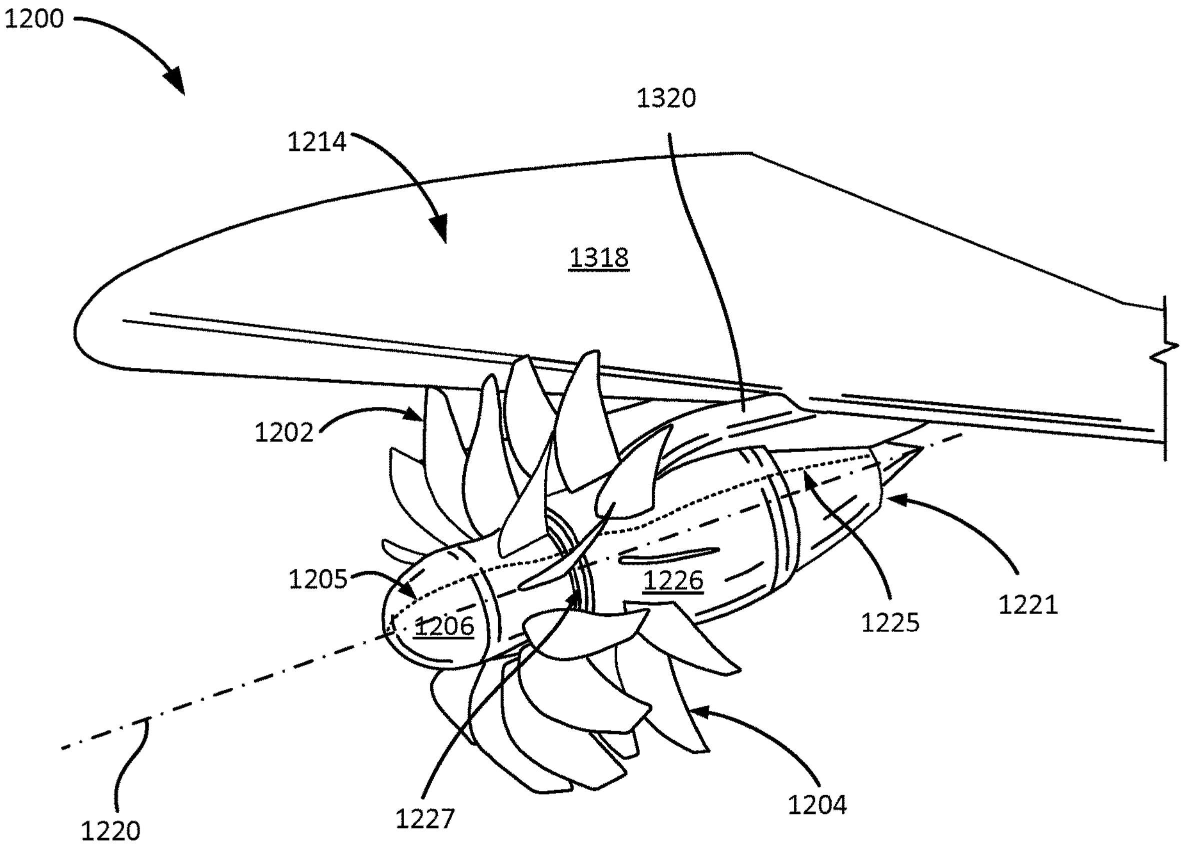
FIG. 13 is a schematic, perspective view of an exemplary gas turbine engine attached to a wing of an aircraft in accordance with some embodiments.

FIG. 13 is a perspective view of an exemplary gas turbine engine attached to a wing of an aircraft in accordance with some aspects of the present disclosure. FIG. 13 depicts the unducted fan propulsor 1200 mounted to a wing 1318 via a pylon 1320 to facilitate mounting to, or accommodation of the airframe structure. Additionally, each of blades may not all be equally spaced from each other and/or at the same axial, z, location. These are examples of where a housing 1226 may not be axisymmetric.

The unducted fan propulsor 1200 includes a turbomachine substantially contained within a forward housing or spinner 1206 and aft housing 1226. In some configurations, both the forward housing 1206 and the aft housing 1226 include rotating hubs associated with rotating blades 1202 and 1204, respectively. In other configurations, one of the forward housing 1206 and the aft housing 1226 are entirely rotating or include a rotating structure such as a rotating hub, while the other is a stationary housing associated with respective rotating and stationary blades. In some embodiments, forward housing 1206 may be considered a spinner and aft housing 1226 may be considered a nacelle. Aft housing 1226 may contain a compressor, combustor, and turbine of a turbomachine, followed by engine exit 1221.

In an illustrative non-limiting example as depicted in FIG. 13, the unducted fan propulsor 1200 includes a rotating assembly (or rotor) that includes a forward housing 1206 and airfoil-shaped assembly of blades 1202 (may also be referred to as a fan, rotor, or propeller) associated with the forward housing 1206. In this example, the forward housing 1206 is a spinner that rotates about an axis of rotation 1220. In other configurations the forward housing may not be rotating, as when the system is comprised of a stationary forward blade assembly and rotating aft blade assembly. The unducted fan propulsor 1200 also includes a stationary assembly that may include the engine inlet 1227 and airfoil shaped stationary assembly of blades 1204 associated with aft housing 1226. In such a configuration, the housing 1226 is non-rotating, as are the blades 1204, about the axis 1220 although the blades may separately articulate to modify a pitch, lean or sweep angle, e.g., via a mechanism contained within housing 1226. At least one of the functions of the stationary assembly of blades 1204 is to remove swirl from air stream leaving the rotor.

Aft housing 1226 extends in an axial direction from engine inlet 1227 to the engine exit 1221. The aft housing 1226 contains the internal machinery that produces torque for the assembly of blades 1202 and defines a surface shaped to provide aerodynamic efficiency (reduce drag) for air passing through blades 1202 and 1204 and proceeding downstream. The stream exhausted from the engine exit 1221 produces some of the thrust that propels and/or advances an aircraft forward. Most of the thrust produced by an engine of the unducted fan propulsor 1200 comes from accelerated air that passes over the housing 1226, or the air that passes through the blades 1204 and bypasses the inlet 1227. In some embodiments, the engine may additionally include a third stream (the first and second streams being the bypass and turbomachine core airstream defined by a compressor, combustor, and turbine).

For simplicity of illustration in FIG. 13, forward housing 1206 is shown as a continuous spinner. However, each housing may be comprised of separate parts with various mechanical components to allow variable pitch angle of the forward assembly of blades 1202 and/or aft assembly of blades 1204. The axial extent of such specialized parts of each housing may be approximately the same as a corresponding axial extent of the assembly of blades 1202 and/or assembly of blades 1204, or the axial extents of the housings may be shorter or longer (in axial extent) than the span of blades or respective axial extents of the blade assemblies. The dot-dashed line in FIG. 13 indicates an axis of rotation 1220 for the blades 1202. The dashed curves, 1205 and 1225, represent flowpath curves corresponding to the intersection of housings 1206 and 1226, respectively, with a plane that includes axis of rotation 1220. In the illustrative example in which forward housing 1206 and the associated forward assembly of blades 1202 are rotating about axis of rotation 1220, the shape of the flowpath curve may be defined by an effective radius vs. axial distance parallel to the axis of rotation 1220. However, in this example in which the aft housing 1226 and the associated aft assembly of blades 1204 do not rotate about axis of rotation 1220, the flowpath curve shape of radius vs. axial location depends on the orientation of the z-r plane about the axis of rotation, i.e., curve could have a different shape for different positions of the plane that intersects aft housing 1226.

Referring to FIGS. 12 and 13, a flow restriction, known as blockage, for the flow of air passing through the row of blades 1202 and/or blades 1204 may be presented due to the assembly of blades 1202 and/or the stationary assembly of blades 1204 having thickness. Thus, not only does the flow of air accelerate through the row due to the generation of thrust, but the flow of air must accelerate further due to the blockage. At a high subsonic cruise, such as a flight Mach number ($M_0$) that results in a suppressed Mach number $M_s$ greater than about 0.70, these combined effects of the generated thrust and the blockage can cause the axial component of the velocity of the flow of air through the row to approach the speed of sound (i.e., suppressed Mach number of 1), known as choking, which can lead to high pressure loss within the blade 1202 or blade 1204 passage. Higher blade 1202 or blade 1204 counts, such as 8 to 18, can make choking a major concern because increasing the count increases the overall blockage of blade material for the air stream being accelerated by the assembly of blades 1202.

Figure 14:
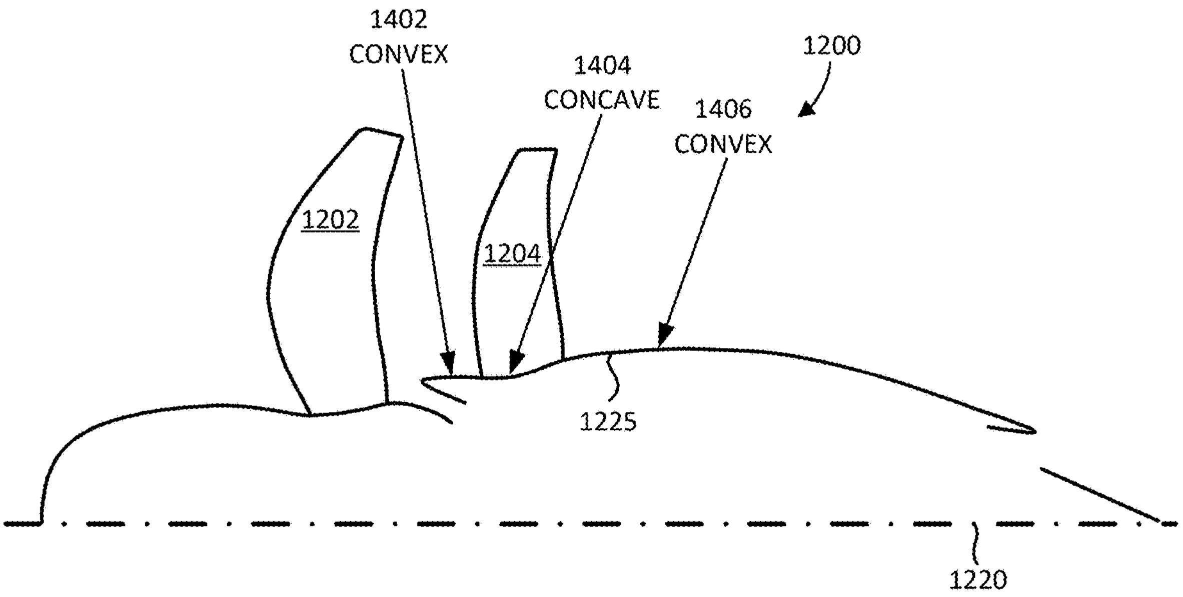
FIG. 14 is a cross-section of an exemplary unducted fan propulsor showing curvature along a flowpath curve in accordance with some embodiments.

A strategy known as area ruling can reduce the suppressed Mach number in the passages within the blades 1202 or blades 1204. To visualize area ruling, FIG. 14 shows a section view of unducted fan propulsor 1200. Flowpath curve 1225 corresponds to the intersection of the external surface of housing 1226 of FIGS. 12 and 13 with a section plane that includes axis of rotation 1220 as well as the aft-most point of an aft blade root 1236 of a blade 1204 in the aft blade assembly. Thus, a point on the external surface of housing 1226 is determined by choosing a blade root 1236 and the distance upstream or downstream parallel to the axis of rotation 1220 from the aft-most point of the blade root 1236. By making an aft housing surface concave 1404, the suppressed Mach number within the passage of blades 1204 can be reduced. The aft housing concave region 1404 corresponds to a valley and locates a local minimum radius of the surface of the housing. Referring to the corresponding flow of air through the blades 1204 and over the housing, i.e., the flowpath curve 1225, there is seen a desirable reduction in velocity due to the concave shape of the housing at the location of blades 1204. To achieve this concave region 1404, which produced a desired result (lowered suppressed Mach number at the blades 1204 to avoid choking) the radial distance of curve 1225 from the axis of rotation 1220 away from the blades 1204 must increase, leading to convex 1406 curvature downstream and possibly convex curvature 1402 upstream. Thus, not only may the housing 1226 need to bulge outward to accommodate internal components of the propulsion system, but it may also need to bulge outward to avoid choking in the passages between blades 1204.

There may also be formed on the housing a convex portion 1402 on the housing surface upstream of the blades 1204. Thus, the housing 1226 may bulge outward to accommodate internal components of the unducted fan propulsor and bulge upstream for, e.g., accommodating components or the inlet 1227. It may also be desirable to minimize the axial length of the unducted fan propulsor. The goal of avoiding choking while limiting axial length may result in increasing the surface curvature of the housing 1226, thereby causing local accelerations of the air along the flowpath curve 1225, particularly at a convex portion. As described below, curvature near a convex portion of the surface of the flowpath curve 1225 can present a challenge at high subsonic flight.

Figure 15:
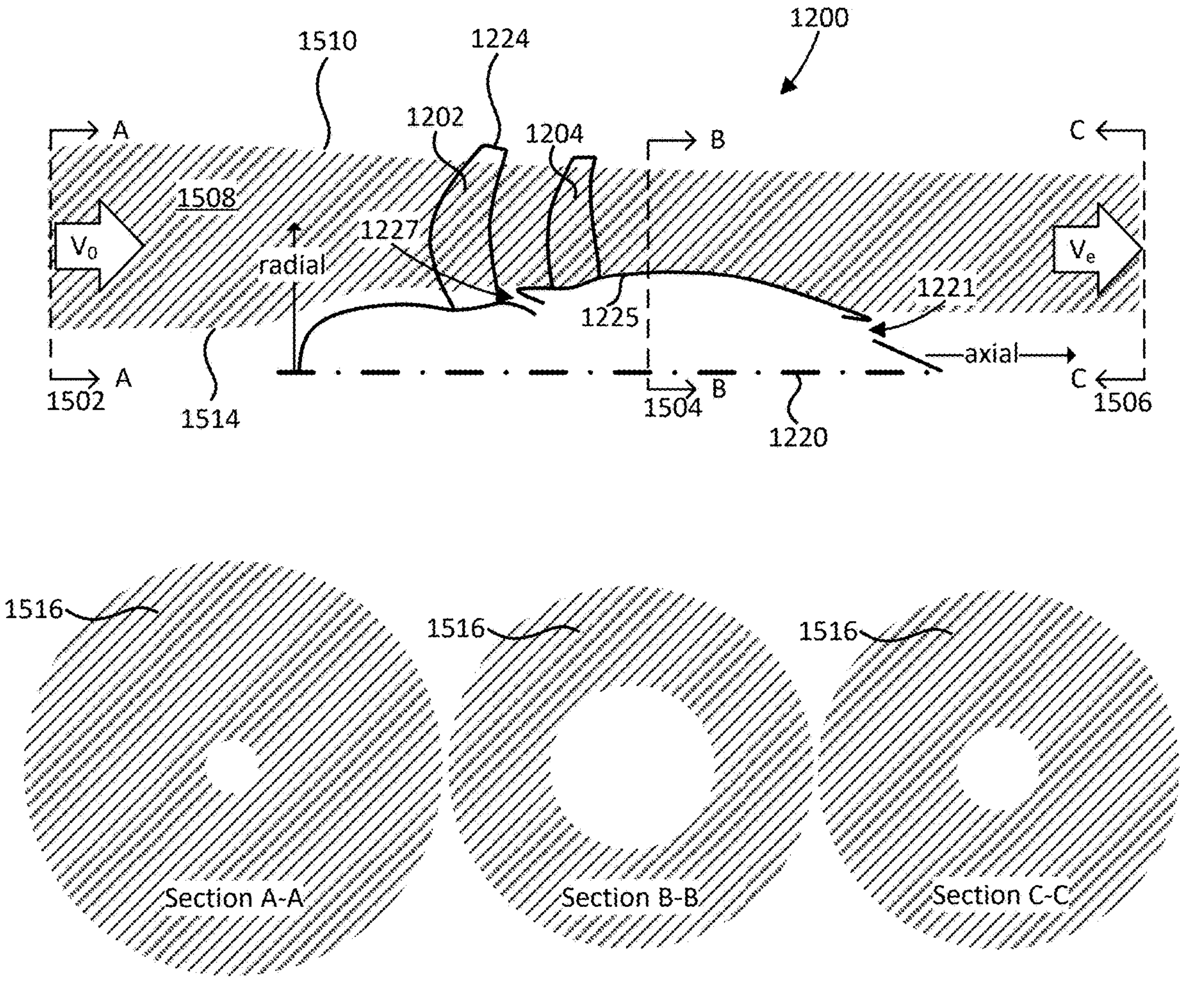
FIG. 15 illustrates a flow of air through an assembly of blades of an unducted fan propulsor in accordance with some embodiments.

FIG. 15 illustrates the flow of air through the fan of an unducted fan propulsor 1200 of FIG. 12. Airspeed relative to the unducted fan propulsor 1200 and far upstream 1502 of the unducted fan propulsor 1200 has a velocity $V_0$ (e.g., corresponding to $0.74<M_0<0.86$), which is the flight speed of the aircraft. Closer to the fan, the influence of the fan is to induce a higher velocity of air as the air enters the fan. As the air passes through the fan, the fan adds power to the stream of air passing through it, to accelerate (i.e., further increase the velocity) of the air that passes over the remainder of the propulsion system. In an area far downstream 1506 in the axial direction, the stream of air reaches an exhaust velocity, $V_e$.

The stream of air that passes through the assembly of blades 1204, from far upstream to far downstream, can be viewed as a tube of air (or fan stream tube) 1508. The radial and axial extent of the fan stream tube 1508 (airflow of the slipstream) is indicated by the hashed region. An outer boundary 1510 of the fan stream tube 1508 intersects a radially outermost section (or tip) 1224 of the assembly of blades 1202. An inner boundary 1514 of the fan stream tube 1508 intersects the assembly of blades 1204 near the flowpath curve 1225 and follows the shape of the flowpath curve 1225 immediately downstream of the assembly of blades 1204. Because in this illustrative example the engine inlet 1227 ingests air from the innermost radial region between blades 1202 and 1204, the fan stream tube 1508 excludes the portion of air passing through the blades 1202 that enters the engine inlet 1227 and exhausts through the engine exit 1221. The average axial velocity of air at any axial location within the fan stream tube 1508 can be visualized by an annular cross-sectional area 1516 of the fan stream tube 1508 at that location. Examples of an annular cross-sectional area 1516 of the fan stream tube 1508 are the far upstream 1502, a nacelle bulge 1504, and the far downstream 1506 for selected locations along the fan stream tube 1508.

Because the mass flow rate of the air through any annular area within the stream tube 1508 and downstream of the inlet 1227 is the same and the air density is roughly constant throughout the fan stream tube 1508, the average axial velocity of air is roughly inversely proportional to the annular area 1516. Thus, far upstream 1502, where the velocity of the fan stream tube 1508 entering the fan has not yet increased due to the fan, the annular area 1516 is largest. Far downstream 1506, the fan stream tube 1508 includes energized air at a higher velocity relative to the velocity of air in the far upstream 1502, so the annular area 1516 is smaller than in 1502. The smallest annular area relative to the annular areas along the fan stream tube 1508 occurs over the housing 1226 near bulge 1504. At the nacelle bulge 1504, the air has been energized by the assembly of blades 1204, the radial distance from the axis of rotation is at a maximum radius, and the annular area 1516 is the smallest relative to the other mentioned annular areas of the flowpath curve 1225. Thus, the average axial velocity of the flow of air over the housing 1226 (defining the surface of the flowpath curve 1225) is high and attributable to a bulge in the flowpath curve 1225.

Figure 16:
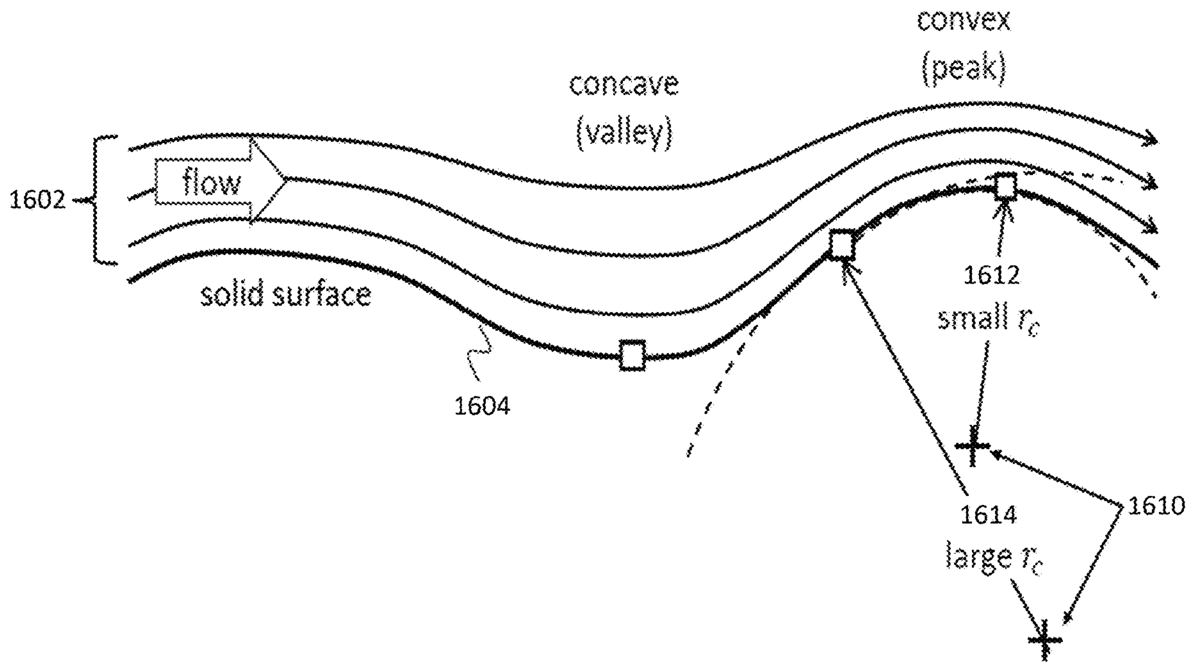
FIG. 16 illustrates an effect on air when air moves over a non-linear solid surface.

The problem due to the high average axial velocity of the flow of air over the nacelle is further explained in FIG. 16, which depicts the effects when air flows without friction from left to right over a wavy solid surface 1604. Streamlines 1602 indicate the path of fluid particles starting at various distances from the surface 1604. A concave surface 1606, or valley, increases the static pressure and reduces the velocity of the air. In contrast, a convex surface 1608, or peak, decreases the static pressure and increases the velocity of the air. Thus, for flow over housing 1226 of FIG. 12, the change in static pressure and the accompanying opposite change in velocity of air is governed in large part by the curvature associated with the housing 1226.

Curvature of a surface can be expressed in terms of a corresponding radius of curvature. For example, at any point along the surface 1604, one can define the radius of curvature, $r_c$, and a center of curvature 1610. To illustrate, two radii of curvatures 1612, 1614 and their corresponding centers (shown as a "+") 1610 corresponding to two surface locations are shown in FIG. 16. At a distance to the left of the peak of convex surface 1608, the curvature is low, which corresponds to a large r, 1614. Nearer to the peak of convex surface 1608, the curvature is high, which corresponds to a small $r_c$ 1612. Locations within the concave surface 1606 also have low and high curvature. However, for points within concave surface 1606, the center of curvature is located above curve 1604 with the radius of curvature pointing towards the surface 1604.

As explained above, the flow of air over the housing 1226 can have a higher average velocity than the fan flow downstream of the engine, $V_e$ and this effect can present a problem for a high subsonic flight. In particular, as the speed of air over the flowpath surface 1225 approaches the speed of sound, or Mach=1.0, the drag begins to increase sharply. In general, friction drag increases roughly in proportion to the square of the air velocity. However, as the Mach number increases, a larger contributor to the increased in drag comes from wave drag. A wave drag is a drag resulting from shock waves that form as the flow of air near the housing surface 1226 becomes supersonic (e.g., Mach>1.0).

The above explanation illustrates three factors that contribute to high drag. A first factor is high cruise flight Mach, $M_0$, and a corresponding suppressed Mach number $M_s$, for example $0.70<M_s<0.86$. A second factor is high non-dimensional cruise fan net thrust based on fan annular area and flight speed. The same acceleration of the air stream by the fan that produces thrust also tends to increase the drag force on housing 1226 (e.g., nacelle). Expressing thrust non-dimensionally in a way that accounts for flight speed, ambient conditions, and fan annular area yields a thrust parameter $$\frac{F_{net}}{\rho_0 V_0^2 A_{an}},$$

where $F_{net}$ is cruise fan net thrust, po is ambient air density, $V_0$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan. A third factor is a large ratio of maximum radius of housing 1226 relative to the local minimum radius associated with the aft blade root 1236 combined with a relatively small ratio of axial length between the local minimum radius and the maximum radius for housing 1226 to the local minimum radius associated with the aft blade root 1236.

Figure 17:
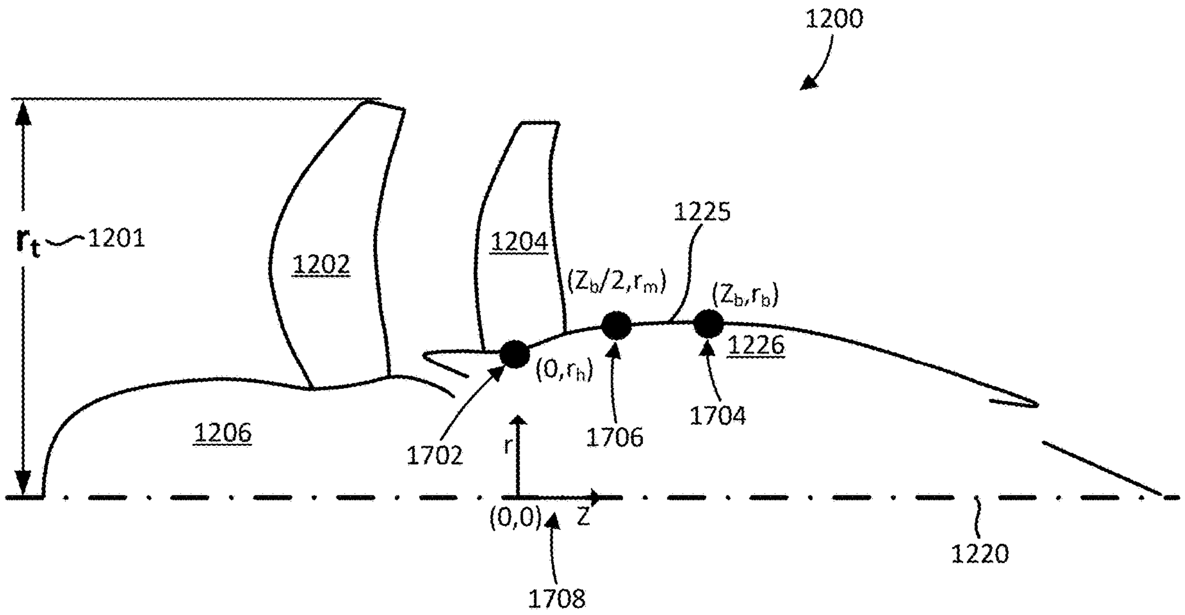
FIG. 17 shows a schematic illustration of three surface locations defining an exemplary flowpath curve for an aft housing in accordance with some embodiments.

A solution to the problem presented by wave drag at a high subsonic flight (e.g., $0.74<M_0<0.86$) is to design a shape of a flowpath curve 1225 on the housing 1226 based on an unconventional surface curvature strategy. FIG. 17 shows a schematic illustration of three surface locations 1702, 1704, and 1706 on the flowpath curve 1225. As for FIGS. 14 and 15, flowpath curve 1225 corresponds to the intersection of the external surface of housing 1226 shown in FIGS. 12 and 13 with a plane that includes axis of rotation 1220 and the aft-most point of an aft blade root 1236 in the aft blade assembly. Thus, curve 1225 corresponds to proceeding along the surface of housing 1226 axially forward and aft from the aft-most point on an aft blade root 1236. If the aft blade used to define the flowpath curve 1225 has variable orientation, such as actuated by a pitch change mechanism, the most relevant aft blade orientation for locating the flowpath curve is when the aft-most point of the aft blade root 1236 is furthest aft. In case the aft-most point of the aft blade root 1236 is not attached to housing 1226, e.g., there is a clearance gap between the aft blade root 1236 and the housing 1226 to allow for pitch change or the aft blade 1204 is attached to the airframe and suspended over the housing 1226, then curve 1225 goes through the nearest point on the surface of housing 1226 to the aft-most point of the aft blade root 1236. Each surface location along flowpath curve 1225 can be defined based on an (z, r) coordinate system 1708 in which the z-axis is the axis of rotation 1220 and r is the distance from the axis of rotation 1220.

Flowpath curve 1225 has a bulge, or maximum radius location 1704 corresponding to ($z_b$, $r_b$) of the (z, r) coordinate system 1708 and has a maximum radius $r_b$. Flowpath curve 1225 has a local minimum location 1702 forward of the bulge location at 1704 corresponding to (0, $r_h$) of the (z, r) coordinate system 1708 and has a radius $r_h$. Surface locations at (0, $r_h$) and ($z_b$, $r_b$) determine the axial and radial extent of a segment of the flowpath curve 1225 where the shape is designed as described herein to solve the problem of high wave drag for high subsonic flight.

Flowpath curve 1225 has a third location 1706 corresponding to ($z_b$/2, $r_m$) in the (z, r) coordinate system 1708 and has an axial distance halfway between the first surface location 1702 and the second surface location 1704. For fixed endpoints 1702 and 1704 for the segment of curve 1225, specifying location of 1706 has a strong effect on the distribution of curvature. Radii $r_h$ 1213, $r_m$ 1217, $r_b$ 1211, and axial distance $z_b$ 1215 are also shown in FIG. 12.

For high subsonic cruise, achieving low drag without unwanted length increase for housing 1226 at high subsonic suppressed Mach number, i.e. $M_s$>0.70, depends on appropriate positioning of points/endpoints/locations 1702, 1704, and 1706. For example, for sufficient bulge to suppress the suppressed Mach number within the aft blade assembly, limited length to avoid excessive friction drag and weight, and limited convex curvature approaching bulge, it may be desirable for $r_b/r_h>1.058$, $z_b/r_h<2.103$, and $(r_m/r_h-1)/(r_b/r_h-1)>0.59$. Better results may be obtained with somewhat larger radius increases and shorter axial distance such that $r_b/r_h>1.084$, $z_b/r_h<1.974$, and $(r_m/r_h-1)/(r_b/r_h-1)>0.64$. Also, it may be beneficial to impose an upper limit on the bulge such that $r_b/r_h<1.424$.

Additionally, the above ratios may be tailored to suit a pre-determined suppressed flight Mach number, $M_s$, with constants A1, B1, and C1, as shown in EQs 1, 2, and 3

$$\frac{r_b}{r_h} = (A1-1)\frac{M_s-0.60}{0.19}+1 \quad \text{EQ. 1}$$

$$\frac{z_b}{r_h} = B1(M_s/0.79)^3 \quad \text{EQ. 2}$$

$$\frac{r_m/r_h-1}{r_b/r_h-1} = C1 \quad \text{EQ. 3}$$

where $M_s$>0.70, A1>1.11, B1<1.63, and C1>0.59. Additional limits on each parameter may yield a more optimum configuration, e.g., 0.70<$M_s$<0.86, 1.11<A1<1.31, 1.23<B1<1.63, and 0.59<C1<0.79. An example of further constraints on the constants used to configure aft housing 1226 include 1.16<A1<1.31, 1.23<B1<1.53, and 0.64<C1<0.79. As another example of constraints on the constants, 1.16<A1<1.26, 1.33<B1<1.53, and 0.64<C1<0.74.

Table 1 provides examples for the ratio of the bulge radius ($r_b$) 1211 to the local minimum radius ($r_h$) 1213 where 1.11<A1<1.31 (in bold) and 0.70<$M_s$<0.86, for a range of F values from 0 to 0.05 for the suppressed Mach number $M_s$.

TABLE 1

| $M_s$ | A1 values & $r_b/r_h$ | | | | |
|---|---|---|---|---|---|
| (ε = 0.05) to (ε = 0) | 1.11 | 1.16 | 1.21 | 1.26 | 1.31 |
| 0.70-0.74 | 1.058-1.081 | 1.084-1.118 | 1.11-1.155 | 1.137-1.192 | 1.163-1.228 |
| 0.75-0.79 | 1.087-1.110 | 1.126-1.160 | 1.166-1.210 | 1.205-1.260 | 1.245-1.310 |
| 0.80-0.84 | 1.116-1.139 | 1.168-1.202 | 1.221-1.265 | 1.274-1.328 | 1.326-1.392 |
| 0.82-0.86 | 1.127-1.151 | 1.185-1.219 | 1.243-1.287 | 1.301-1.356 | 1.359-1.424 |

Table 2 provides examples for the ratio of the axial distance 1215 between the local minimum and the bulge location and the local minimum radius ($r_h$) 1213 where 1.23<B1<1.63 (in bold) and 0.70<$M_s$<0.86, for a range of F values from 0 to 0.05 for the suppressed Mach number $M_s$.

TABLE 2

| $M_s$ | B1 values & $z_b/r_h$ | | | | |
|---|---|---|---|---|---|
| (ε = 0.05) to (ε = 0) | 1.23 | 1.33 | 1.43 | 1.53 | 1.63 |
| 0.70-0.74 | 0.855-1.011 | 0.925-1.093 | 0.995-1.175 | 1.064-1.257 | 1.134-1.340 |
| 0.75-0.79 | 1.052-1.230 | 1.137-1.330 | 1.222-1.430 | 1.308-1.530 | 1.394-1.630 |

TABLE 2-continued

| $M_s$ | B1 values & $z_b/r_h$ | | | | |
|---|---|---|---|---|---|
| (ε = 0.05) to (ε = 0) | 1.23 | 1.33 | 1.43 | 1.53 | 1.63 |
| 0.80-0.84 | 1.276-1.479 | 1.379-1.599 | 1.483-1.719 | 1.587-1.839 | 1.690-1.959 |
| 0.82-0.86 | 1.376-1.587 | 1.487-1.716 | 1.599-1.845 | 1.711-1.974 | 1.823-2.103 |

Table 3 provides examples for the ratio $(r_m/r_h-1)/(r_b/r_h-1)$ where 0.59<C1<0.79 (in bold) and $0.70<M_s<0.86$, for a range of F values from 0 to 0.05 for the suppressed Mach number $M_s$.

TABLE 3

| $M_s$ (ε = 0.05) | C1 values & $(r_m-r_h)/(r_b-r_h)$ | | | | |
|---|---|---|---|---|---|
| to (ε = 0) | 0.59 | 0.64 | 0.69 | 0.74 | 0.79 |
| 0.70-0.74 | 0.59 | 0.64 | 0.69 | 0.74 | 0.79 |
| 0.75-0.79 | 0.59 | 0.64 | 0.69 | 0.74 | 0.79 |
| 0.80-0.84 | 0.59 | 0.64 | 0.69 | 0.74 | 0.79 |
| 0.82-0.86 | 0.59 | 0.64 | 0.69 | 0.74 | 0.79 |

In addition to applying to a range of suppressed flight Mach number, $M_s$, the above constraints on curve 1225 may be particularly beneficial for a range of a dimensionless cruise fan net thrust parameter normalized by ambient density, cruise flight speed squared, and fan stream tube annular area at fan inlet, $$\frac{F_{net}}{\rho_0 V_0^2 A_{an}}.$$

In the above thrust parameter, $F_{net}$ is cruise fan net thrust, ρo is ambient air density, $V_0$ is cruise flight velocity, and $A_{an}$ is annular cross-sectional area perpendicular to the axis of rotation of the fan stream tube entering the fan. For the illustrative example shown in FIG. 12, the annular area would be computed using $r_t$ 1201, the radial distance from the axis of rotation 1220 to a tip end of a blade 1202 in the forward blade assembly, and the minimum radius of the fan stream tube at the same axial location. For the example of FIG. 12 in which the engine inlet stream occupies a portion of the forward blade assembly annular area, a method to estimate the minimum radius of the fan stream tube would be used by those skilled in the art, using parameters such as fan thrust, engine inlet flow, and flight conditions. The thrust parameter may be, greater than or equal to 0.060, (e.g., greater than 0.080, or greater than 0.084).

Figure 18:
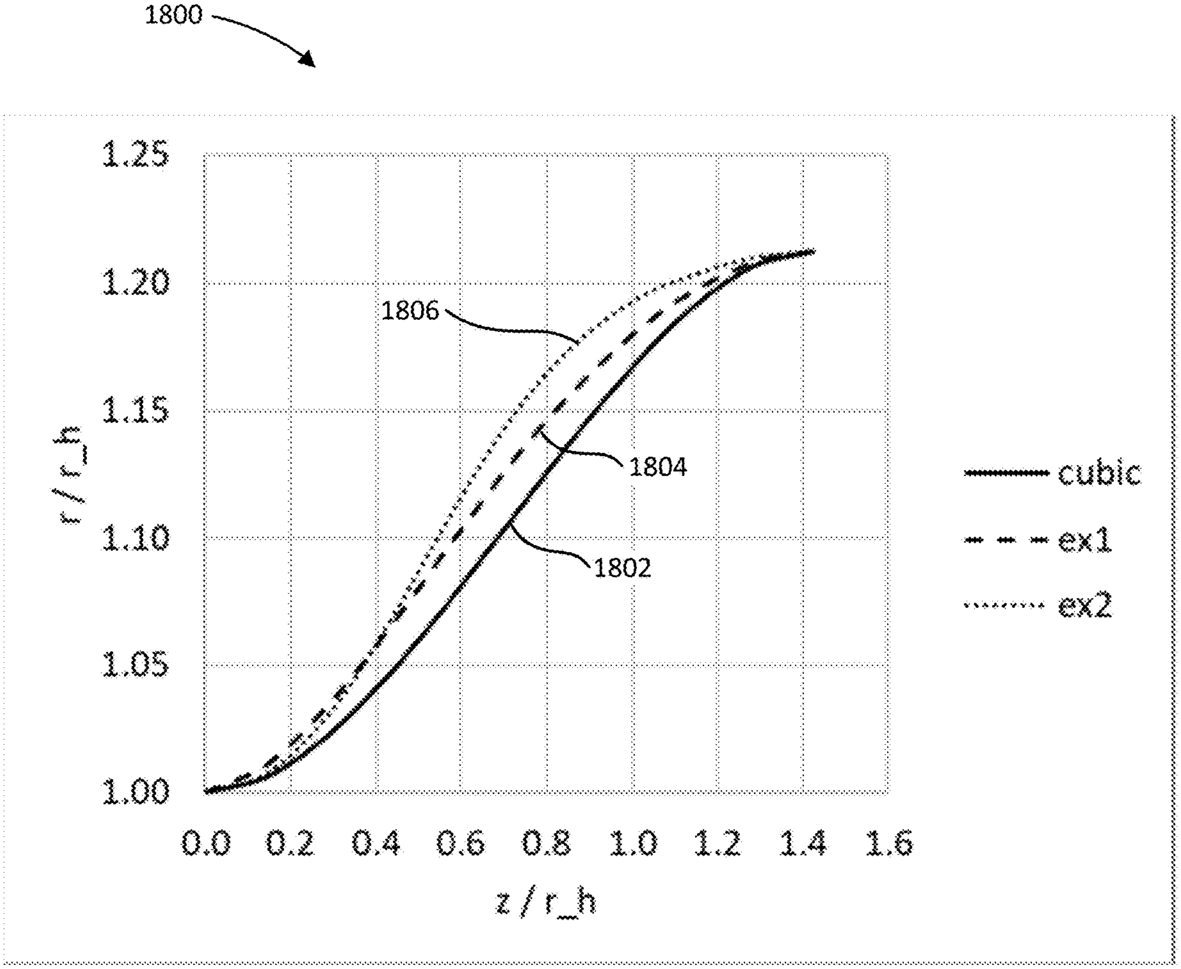
FIG. 18 illustrates examples of flowpath curves for an aft housing in accordance with some embodiments.

The unconventional surface curvature strategy described above to solve the problem presented by the wave drag for a sustained high subsonic flight (e.g., $0.74<M_0<0.86$) is applicable for the unducted fan propulsors as described herein. In some configurations, the unconventional surface curvature strategy may be applicable to an unducted fan propulsor having no engine inlet (inlet 1227 omitted); for example, a rotor not driven by an air-breathing engine, but driven by another type of machine, such as an electric motor. FIG. 18 depicts a graph 1800 of three exemplary flowpath curves 1225 that may be used to define the surface of housing 1226 shown in FIGS. 12 and 13. The flowpath curves 1225 proximate aft housing 1226 and between the surface locations at $(0, r_h)$ and $(z_b, r_b)$ of the (z, r) coordinate system 1708 as shown in FIG. 17.

Figure 19:
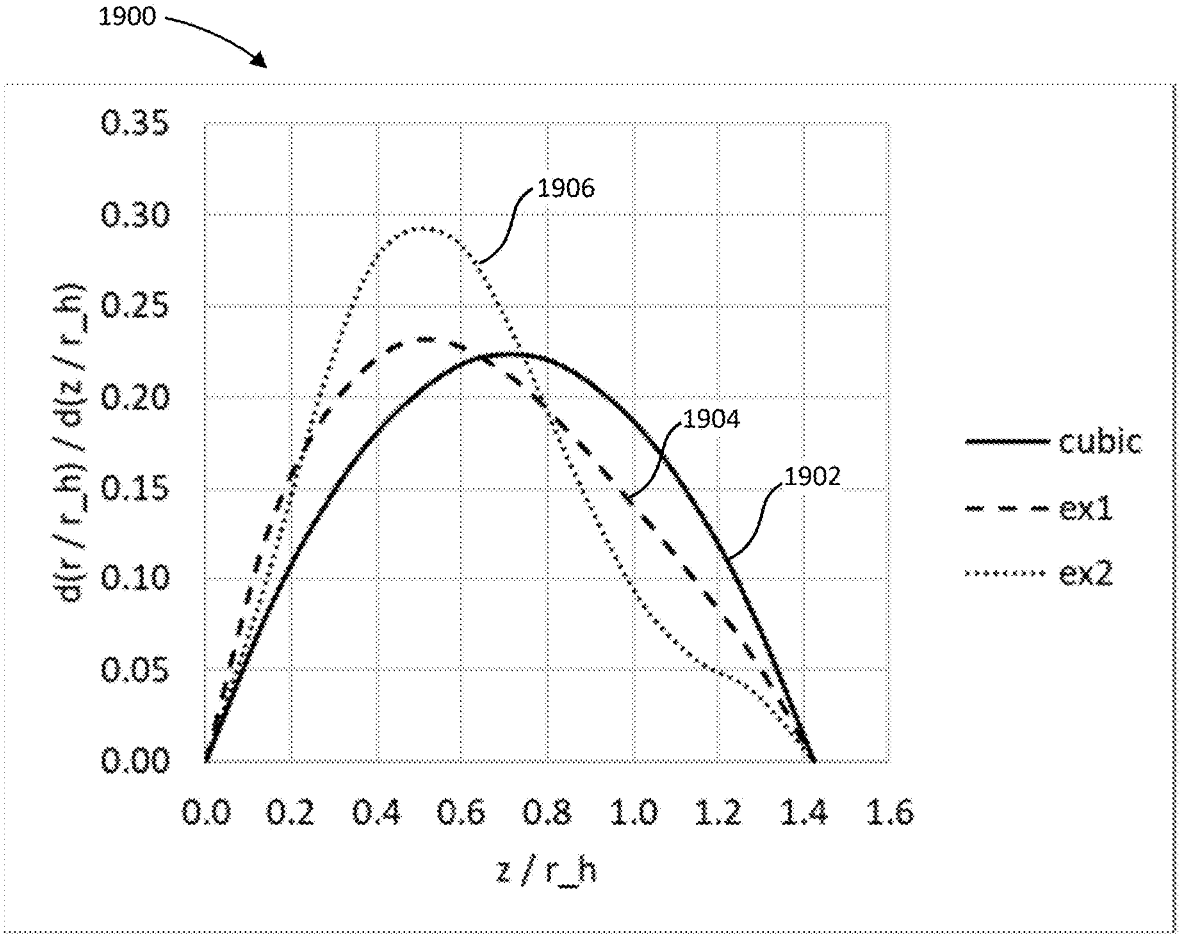
FIG. 19 shows an exemplary graph of the same three flowpath curves in FIG. 18 in terms of their first derivative with respect to axial distance in accordance with some embodiments.

To explain how the points 1702, 1704, and 1706 in FIG. 17 define the shape of the aft housing 1226 to reduce drag at high speed flight, three exemplary flowpath curves 1225 between points 1702 and points 1704 are plotted with z and r nondimensionalized by the local minimum radius $r_h$ in graph 1800 of FIG. 18. To facilitate comparison, the three curves conform to EQS. 1, 2, and 3 with $M_0$=0.79, A1=1.21, and B1=1.43, with differences only in parameter C1. Flowpath curve 1802 corresponds to C1=0.50 and is described by a cubic polynomial shape, labeled “cubic”. Flowpath curve 1802 gives a smooth variation in curvature relative to curves 1804 and 1806. Flowpath curve 1804 corresponds to C1=0.61 and is labeled “ex1”. Flowpath curve 1806 corresponds to C1=0.69 and is labeled “ex2”. Over more than the first one-third of its length, flowpath curve 1804, designated “ex1,” has a more rapid increase radius with axial distance than curve 1802. Flowpath curve 1806, designated “ex2,” also has a more rapid increase in radius than curve 1802, but has less variation in radius near the peak radius of the housing (the flowpath curve 1225 location having the maximum radius $r_b$) than either curve 1802 or 1804. FIG. 19 shows a graph 1900 the first derivatives of r with respect to z for the curves in FIG. 18. All curves begin and end with first derivative of zero because the ends are at the local minimum and maximum radii. Plots 1902, 1904 and 1906 correspond to the first derivatives of the cubic, ex1, and ex2 curves in FIG. 18.

Figure 20:
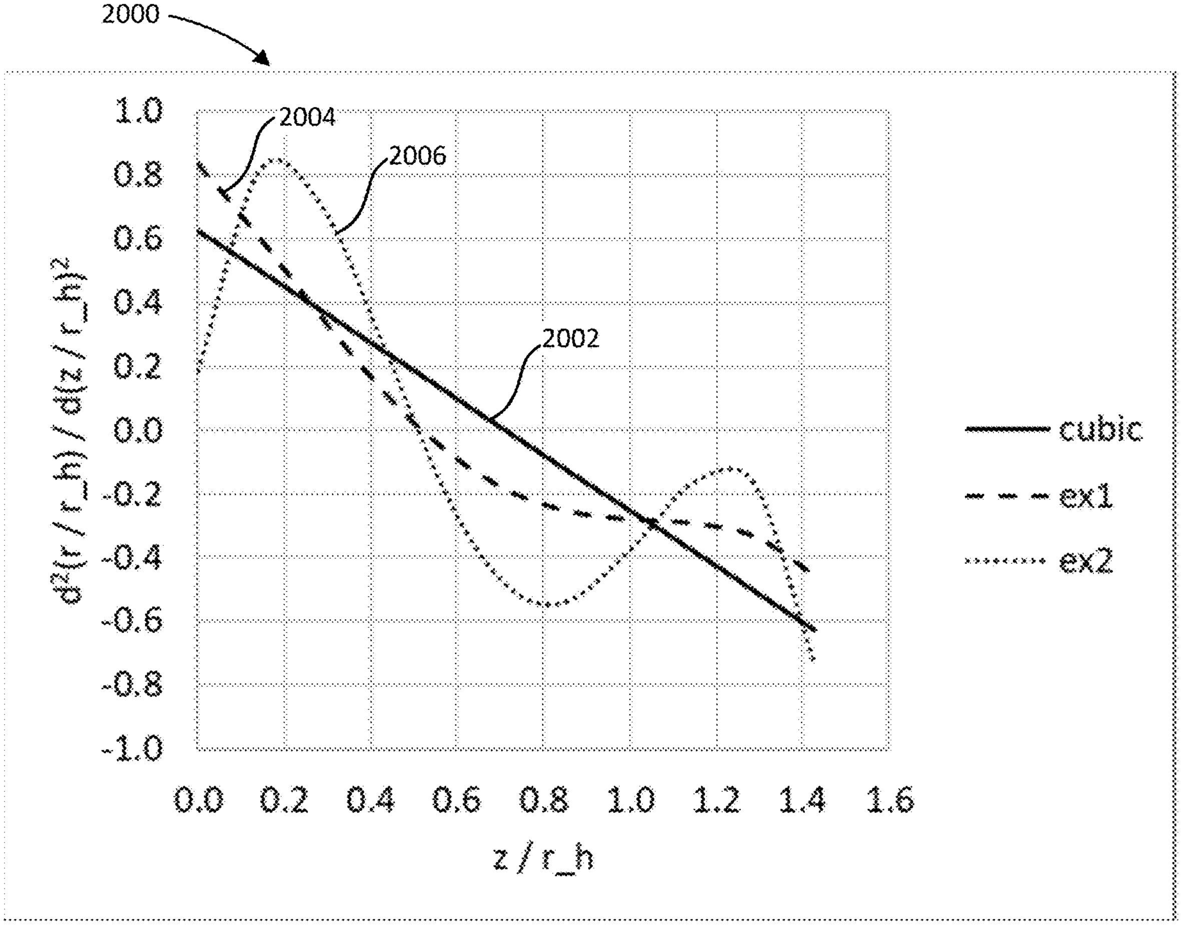
FIG. 20 illustrates curvature by showing the second derivative with respect to axial distance of the three curves in FIG. 18 in accordance with some embodiments.

FIG. 20 shows a graph 2000 of the second derivatives of r with respect to z for the three curves in FIG. 18. Second derivative indicates curvature and a positive second derivative indicates concave curvature while a negative second derivative indicates convex curvature. The absolute value of the second derivative indicates the magnitude of curvature. Curves 2002, 2004 and 2006 are the second derivatives for the flowpath curves “cubic”, “ex1” and “ex2”, respectively, shown in FIG. 18. The cubic polynomial flowpath curve has the smoothest curvature variation (linear with axial distance). Flowpath curve “ex1” also has a monotonic variation in curvature, however, its curvature 2004 starts higher near the aft blade root 1236 and decreases continuously towards the maximum radius. “Front-loading” the curvature in this way results in a lower magnitude of convex curvature at the maximum radius than curvature 2002. Flowpath curve “ex2” has larger variations in third curvature 2006 that achieve suppression of the Mach number within the passages of blades 1204 and avoids high convex curvature immediately upstream of the maximum radius. Because curve “ex2” has relatively low convex curvature where the combined effects of fan stream tube acceleration and flowpath curve radius increase may otherwise lead to excessive Mach number, the third curvature 2006 (“ex2”) may be preferred.

As previously discussed, the speed at which an aircraft can fly is limited by numerous factors. With respect to propeller-driven aircraft, the propeller plays an important role in the speed at which the aircraft can fly. At a high level, the larger the propeller and/or the greater the number of blades the propeller has, the faster the aircraft can fly. Unfortunately, while speed is often directly proportional to both the size of the propeller and the number of blades, so is weight, and large size creates problems for propulsion system installation and feasibility. For example, as the size of the propeller and/or the number of blades increases, the weight of the propeller generally increases, and larger propellers can be difficult to accommodate while maintaining ground or fuselage clearances for a select airframe configuration. Also, at high subsonic flight speeds, a larger number of blades increases the flow-area blockage in the propeller blade row, which is problematic given the transonic flow around the blades. In particular, too much blockage decreases propeller efficiency and range of operability. Accordingly, creating an acceptable aircraft capable of flying at higher sustained speeds (e.g., cruise speeds) requires more than increasing the size of the propeller and/or increasing the number of propeller blades.

Figure 21:
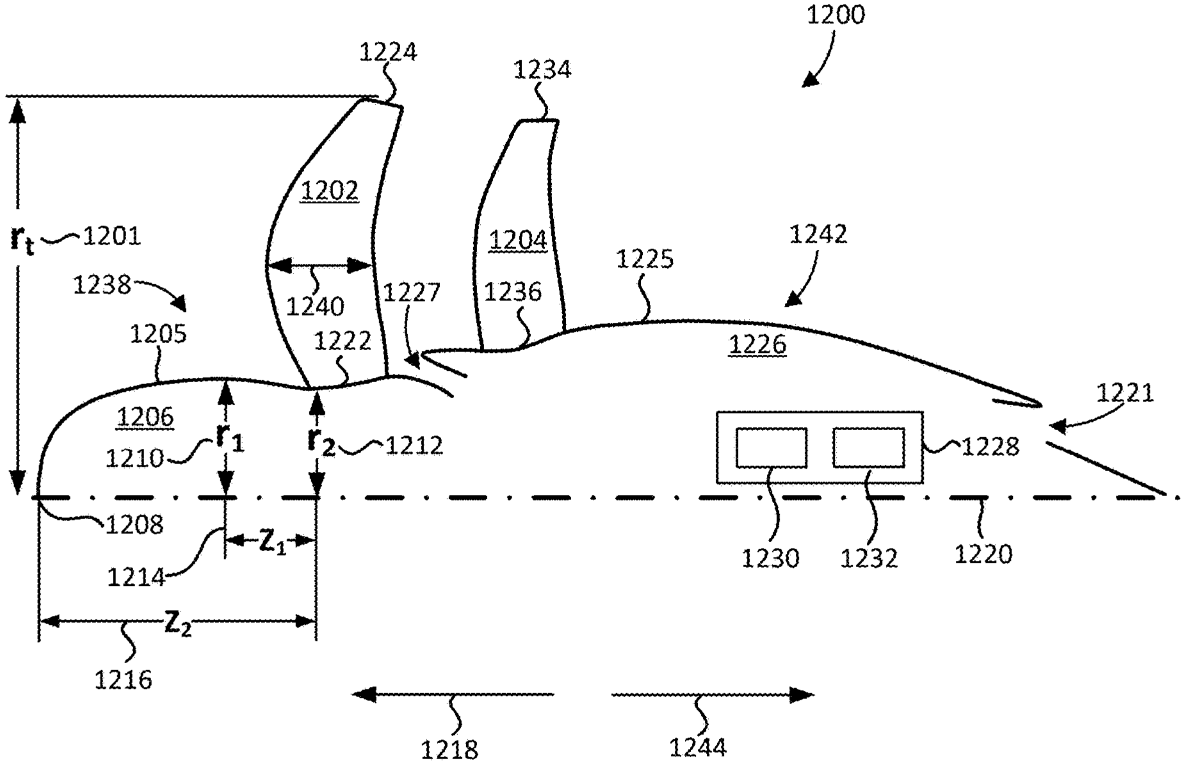
FIG. 21 shows the same elevational cross-sectional view of the unducted fan propulsor of FIG. 12, but with element numbering referring in particular to a forward housing or spinner portion, in accordance with some embodiments.

FIG. 21 shows the same cross-sectional view as in FIG. 12, but with annotations made to the forward part of the unducted fan propulsor 1200, in particular the rotating element 1238, which comprises a forward housing depicted as spinner 1206 and the plurality of blades 1202. The blades 1202 have blade roots 1222 and blade tips 1224. The blades 1202 are affixed to the spinner 1206 at the blade roots 1222. The rotating element 1238 can have any suitable number of blades 1202. For example, in one embodiment, the rotating element 1238 includes between 8 and 18 blades. The spinner 1206 and the blades 1202, as part of the rotating element 1238, rotate about the axis of rotation 1220. The spinner 1206 has a forward-most point/end/location 1208, relative to an arrow 1218 indicating a direction of travel of the unducted fan propulsor 1200 and thus the aircraft.

The forward housing 1206 is shaped such that it has a varying radius along its axial length and its shape is viewed along a flowpath curve 1205 formed by the intersection of the spinner surface with a plane that includes the axis of rotation 1220 and the forward-most point of a forward blade root 1222. As stated previously, a flowpath curve is defined by the effective radius at axial locations in which the housing is rotating. Thus, in the illustrative example of FIG. 21, the forward blade root 1222 chosen to construct the plane does not affect the flowpath curve 1205. However, in some embodiments, the forward housing 1206 may be stationary. Thus, the convention of specifying a forward blade root 1222 to define the plane, and thus, flowpath curve 1205, applies in other embodiments as this facilitates defining the curve for embodiments in which forward housing 1206 is stationary. Flowpath curve 1205 for spinner 1206 has a bulge location at the axial location where the radius reaches a maximum axially forward of the forward-most point of forward blade root 1222 of blade 1202, determining the first radius 1210 (denoted "$r_1$" in FIG. 21). Flowpath curve 1205 for spinner 1206 has a local minimum location where, proceeding axially aft from the bulge, the radius reaches the local minimum proximal to the blades 1202, determining the second radius 1212 (denoted "$r_2$" in FIG. 21). Thus, the axial location of the first radius 1210 is located forward of the axial location of the second radius 1212 (i.e., between the axial location of the second radius 1212 and the forward-most location 1208 of the spinner 1206). Span of blade 1202 is defined as the distance between blade root 1222 and blade tip 1224. In one embodiment, the blades 1202 have a maximum axial distance/width 1240 near mid span (i.e., 50% of the blade height from the blade root to blade tip). In one embodiment, the blades 1202 are affixed to the spinner 1206 such that, when oriented or configured for cruise operation, the forward-most point of the blade roots 1222 is proximal to the local minimum having second radius 1212, and such that 0 to 40 percent of the maximum width 1240 is located forward of the forward-most point of the blade roots 1222. In another embodiment, 20 to 40 percent of the maximum width 1240 is located forward of the forward-most point of the blade roots 1222.

In one embodiment, the first radius 1210 is greater than the second radius 1212 and thus defines a bulge of the spinner 1206, the location on the spinner proceeding axially forward from the forward blade root 1222 where the radius reaches a maximum. A first distance 1214 (denoted by "$z_1$" in FIG. 21) is defined between the bulge having first radius 1210 and the local minimum having second radius 1212. A second distance (denoted by "$z_2$" in FIG. 21) is defined between the forward-most location 1208 of the spinner 1206 and the local minimum having second radius 1212. The various parameters (i.e., the first radius 1210, the second radius 1212, the first distance 1214, and the second distance 1216) may be specified based on a predetermined speed of the aircraft. That is, suitable values for the various parameters are dependent upon a predetermined range of speeds of the aircraft. In some embodiments, the predetermined speed of the aircraft is based on a desired airspeed for the aircraft. For example, the predetermined speed for the aircraft can be a speed, or range of speeds, at which the aircraft is designed to operate while cruising. The predetermined speed for the aircraft can be any suitable value(s) and can range, for example, between Mach 0.74 and 0.86 also referred to herein as a high subsonic cruise speed. Though the example predetermined speed range of the aircraft is given as between Mach 0.74 and Mach 0.86, it should be noted that the range can be greater, or smaller, than the range provided and have higher and/or lower maximums and minimums. For example, predetermined flight Mach number can be between 0.78 and 0.84.

At a high level, the size of the bulge (i.e., the ratio of the first radius 1210 to the second radius 1212) beneficial for low pressure loss on the spinner and within the assembly of blades 1202 increases as the predetermined speed of the aircraft increases. Put simply, the larger the bulge, the lower the flow velocities through the row of blades 1202 for a particular flight speed. However, as the size of the bulge increases, the required length of the spinner 1206 increases, increasing the weight of the rotating element 1238. Accordingly, the size of the bulge is dictated by a number of factors based on the predetermined speed of the aircraft. Additionally, the minimal dimension of the second radius 1212 is typically dictated by the equipment needed for the rotating element 1238, such as blade retention hardware, pitch change mechanisms, counterweight systems, gearbox, gearbox cooling systems, lubrication systems, bearings, and drive shaft.

In one embodiment comprised of a forward assembly of blades and an aft assembly of blades, the non-dimensional bulge radius is $r_1/r_2>1.021$. In other embodiments, the size of the bulge is described by a ratio of the first radius 1210 and the second radius 1212 and defined by EQ. 4:

$$\frac{r_1}{r_2} = (A2 - 1)\frac{M_s - 0.60}{0.19} + 1,$$

Where $r_1$ is the first radius 1210, $r_2$ is the second radius 1212 associated with housing 1206, $M_s$ is Mach number for sustained high speed flight, such as cruise, of the aircraft, and A2 is a constant. In one embodiment, the value of A2 is within the range from 1.04 to 1.14. As can be seen by EQ. 4, the size of the bulge (i.e., the ratio of the first radius 1210 to the second radius 1212) increases as the predetermined speed of the aircraft increased for each value of A2 within the range. Specifically, for a minimum value of A2=1.04, the ratio of the first radius 1210 to the second radius 1212 is 1.021 to 1.029 for $M_s$=0.70 to 0.74, 1.032 to 1.040 for $M_s$=0.75 to 0.79, 1.042 to 1.051 for $M_s$=0.80 to 0.84, and 1.046 to 1.055 for $M_s$=0.82 to 0.86. For a maximum value A2=1.14, the ratio of the first radius 1210 to the second radius 1212 is 1.074 to 1.103 for $M_s$=0.70 to 0.74, 1.111 to 1.140 for $M_s$=0.75 to 0.79, 1.147 to 1.177 for $M_s$=0.80 to 0.84, and 1.162 to 1.192 for $M_s$=0.82 to 0.86. Table 4 provides examples for the ratio of the first radius 1210 to the second radius 1212 where 1.04<A2<1.14 (in bold) and 0.70<$M_s$<0.86, for a range of F values from 0 to 0.05 for the suppressed Mach number $M_s$.

TABLE 4

| $M_s$ | A2 values & $r_1/r_2$ | | | | |
|---|---|---|---|---|---|
| (ε = 0.05) to (ε = 0) | 1.04 | 1.06 | 1.09 | 1.12 | 1.14 |
| 0.70-0.74 | 1.021-1.029 | 1.032-1.044 | 1.047-1.066 | 1.063-1.088 | 1.074-1.103 |
| 0.75-0.79 | 1.032-1.040 | 1.047-1.060 | 1.071-1.090 | 1.095-1.120 | 1.111-1.140 |
| 0.80-0.84 | 1.042-1.051 | 1.063-1.076 | 1.095-1.114 | 1.126-1.152 | 1.147-1.177 |
| 0.82-0.86 | 1.046-1.055 | 1.069-1.082 | 1.104-1.123 | 1.139-1.164 | 1.162-1.192 |

As previously discussed, the geometry of the spinner 1206 can also be described based on the first distance 1214 (i.e., the axial distance between the bulge having first radius 1210 and the local minimum having second radius 1212). In one embodiment comprised of a forward assembly of blades and an aft assembly of blades, the non-dimensional axial distance $z_1/r_2$<1.522. In another embodiment, the first distance 1214 is described in terms of a ratio of the first distance 1214 to the second radius 1212 and defined by EQ. 5:

$$\frac{z_1}{r_2} = B2\left(\frac{M_s}{0.79}\right)^3$$

where $z_1$ is the first distance 1214, $r_2$ is the second radius 1212, $M_s$ is suppressed Mach number for sustained high speed flight, such as cruise, of the aircraft, and B2 is a value. In one embodiment, the value of B2 is within the range from 0.78 to 1.18. As can be seen by EQ. 5, the first distance 1214 increases as the predetermined speed of the aircraft increases for each value of B2 within the range. Put simply, the length of the spinner 1206 increases as the predetermined speed of the aircraft increases. Specifically, for a minimum value of B2=0.78, the ratio of the first distance 1214 to the second radius 1212 is 0.543 to 0.641 for $M_s$=0.70 to 0.74, 0.667 to 0.780 for $M_s$=0.75 to 0.79, and 0.810 to 0.938 for $M_s$=0.80 to 0.84, and 0.872 to 1.006 for $M_s$=0.82 to 0.86. For a maximum value B2=1.18, the ratio of the first distance 1214 to the second radius 1212 is 0.821 to 0.970 for $M_s$=0.70 to 0.74, 1.009 to 1.180 for $M_s$=0.75 to 0.79, 1.226 to 1.419 for $M_s$=0.80 to 0.84, and 1.320 to 1.522 for $M_s$=0.82 to 0.86. Table 5 provides examples for the ratio of the first distance 1214 to the second radius 1212 where 0.78<B2<1.18 (in bold) and 0.70<$M_s$<0.86, for a range of F values from 0 to 0.05 for the suppressed Mach number $M_s$.

TABLE 5

| $M_s$ | B2 values & $z_1/r_2$ | | | | |
|---|---|---|---|---|---|
| (ε = 0.05) to (ε = 0) | 0.78 | 0.88 | 0.98 | 1.08 | 1.18 |
| 0.70-0.74 | 0.543-0.641 | 0.612-0.723 | 0.682-0.805 | 0.751-0.888 | 0.821-0.970 |
| 0.75-0.79 | 0.667-0.780 | 0.753-0.880 | 0.838-0.980 | 0.924-1.080 | 1.009-1.180 |
| 0.80-0.84 | 0.810-0.938 | 0.914-1.058 | 1.018-1.178 | 1.122-1.298 | 1.226-1.419 |
| 0.82-0.86 | 0.872-1.006 | 0.984-1.135 | 1.096-1.264 | 1.208-1.393 | 1.320-1.522 |

As previously discussed, the geometry of the spinner 1206 can also be described based on a second distance 1216 (i.e., a distance between the forward-most location 1208 of the spinner 1206 and the local minimum having second radius 1212). In one embodiment comprised of a forward assembly of blades and an aft assembly of blades, the non-dimensional axial distance $z_2/r_2$<4.115. In one embodiment, the second distance 1216 is described in terms of a ratio between the second distance 1216 and the second radius 1212 and defined by EQ. 6:

$$\frac{z_2}{r_2} = C2\left(\frac{M_s}{0.79}\right)^3$$

where $z_2$ is the second distance 1216, $r_2$ is the second radius 1212, $M_s$ is the suppressed Mach number for sustained high speed flight, such as cruise, of the aircraft, and C2 is a value. In one embodiment, the value of C2 is within the range from 2.19 to 3.19. As can be seen by EQ. 6, the second distance 1216 increases as the predetermined speed of the aircraft increases. Put simply, the length of the spinner 1206 increases as the predetermined speed of the aircraft increases. Specifically, for a minimum value of C2=2.19, the ratio of the second distance 1216 to the second radius 1212 is 1.523 to 1.800 for $M_s$=0.70 to 0.74, 1.873 to 2.190 for $M_s$=0.75 to 0.79, 2.274 to 2.633 for $M_s$=0.80 to 0.84, and 2.449 to 2.825 for $M_s$=0.82 to 0.86. For a maximum value C2=3.19, the ratio of the second distance 1216 to the second radius 1212 is 2.219 to 2.622 for $M_s$=0.70 to 0.74, 2.729 to 3.190 for $M_s$=0.75 to 0.79, 3.313 to 3.835 for $M_s$=0.80 to 0.84, and 3.567 to 4.115 for $M_s$=0.82 to 0.86. Table 6 provides examples for the ratio of the second distance 1216 to the second radius 1212 where 2.19<C2<3.19 (in bold) and 0.70<$M_s$<0.86, for a range of t values from 0 to 0.05 for the suppressed Mach number $M_s$.

TABLE 6

| $M_s$ | C2 values & $z_2/r_2$ | | | | |
|---|---|---|---|---|---|
| (ε = 0.05) to (ε = 0) | 2.19 | 2.39 | 2.69 | 2.99 | 3.19 |
| 0.70-0.74 | 1.523-1.800 | 1.663-1.964 | 1.871-2.211 | 2.080-2.457 | 2.219-2.622 |
| 0.75-0.79 | 1.873-2.190 | 2.044-2.390 | 2.301-2.690 | 2.557-2.990 | 2.729-3.190 |
| 0.80-0.84 | 2.274-2.633 | 2.482-2.873 | 2.793-3.234 | 3.105-3.594 | 3.313-3.835 |
| 0.82-0.86 | 2.449-2.825 | 2.673-3.083 | 3.008-3.470 | 3.348-3.857 | 3.567-4.115 |

Figure 22:
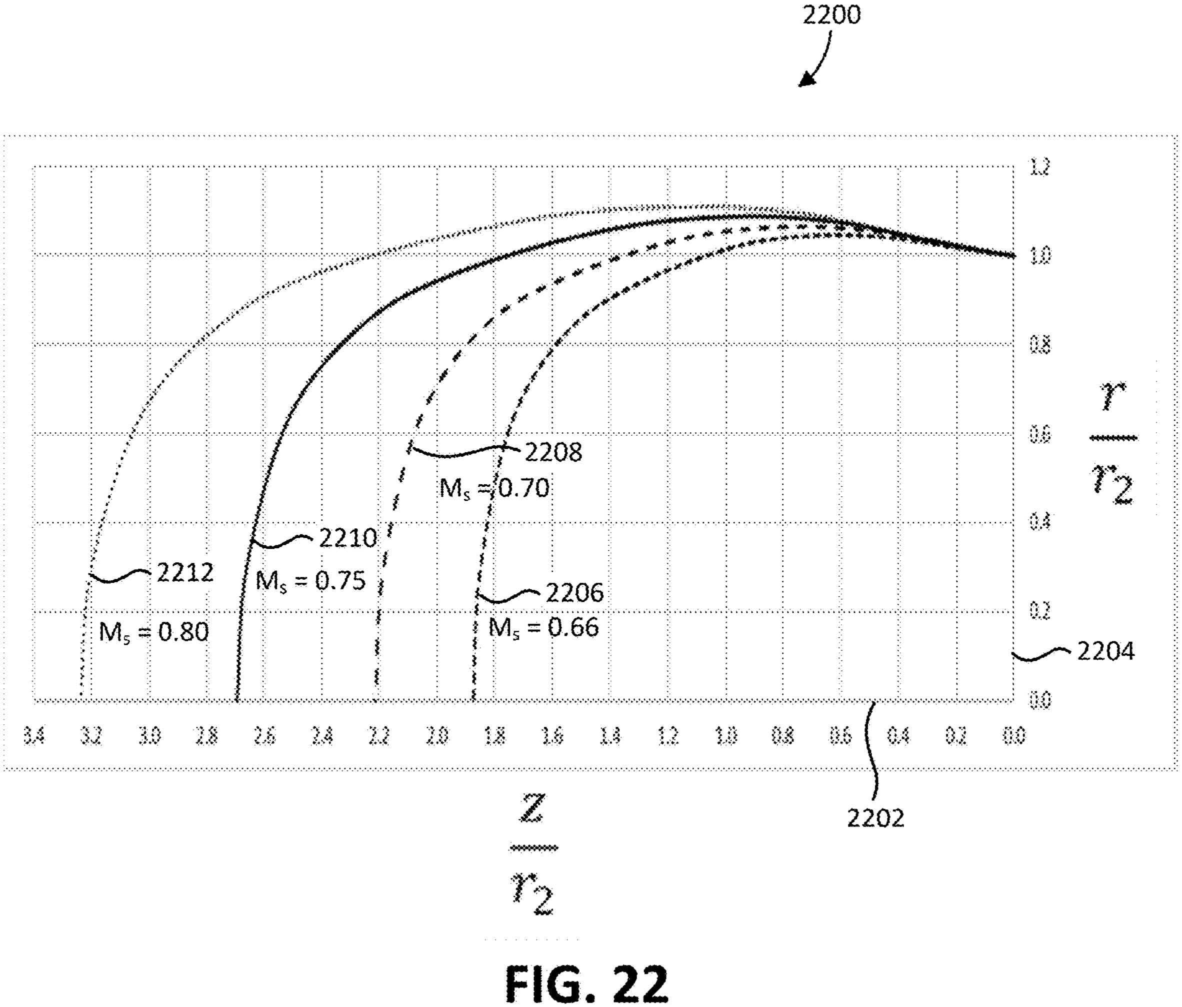
FIG. 22 is a chart depicting shapes for a forward housing of an unducted fan propulsor, according to some embodiments.

While the discussion of FIG. 21 describes an unducted fan propulsor for propelling an aircraft consistent with the teachings herein, the discussion of FIG. 22 provides additional detail regarding a plot of values for geometries of a spinner for such an unducted fan propulsor.

FIG. 22 is a chart 2200 depicting external flowpath shapes for a spinner of an unducted fan propulsor, according to some embodiments. The Y-Axis 2204 represents the spinner radius normalized by the second radius 1212, $r/r_2$, the second radius being at the local minimum within the axial extent of blades 1202 nearest to the bulge having first radius 1210. The X-Axis 2202 represents the axial distance from the axial location of the second radius 1212 (i.e., the local minimum) normalized by the second radius 1212, $z/r_2$.

The chart 2200 illustrates the forward housing or spinner 1206 shape for different suppressed Mach numbers, $M_s$. Specifically, the chart 2200 includes a first plot 2206, a second plot 2208, a third plot 2210, and a fourth plot 2212. Each of the first plot 2206, the second plot 2208, the third plots 2210, and the fourth plot 2212 arise from the same values of A2=1.09, B2=0.98, and C2=2.69, but for a different suppressed Mach number, $M_s$. The first plot 2206 corresponds to $M_s$=0.66, the second plot 2208 corresponds to $M_s$=0.70, the third plot 2210 corresponds to $M_s$=0.75, and the fourth plot 2212 corresponds to $M_s$=0.80. As can be seen from the chart 2200, which depicts approximate shapes and relative sizes of the spinners, the ratio of the first radius to the second radius and the ratio of the second distance to the second ratio increase as the predetermined speed increases.

In addition to specifying the forward housing dimension ratios, further constraints on the shape of the flowpath curve are described herein. A superellipse equation below may provide a suitable distribution of curvature along the flowpath curve 1205 to avoid excessive Mach number along the portion of the forward housing forward of the bulge. In specifying the shape of the spinner using the obtained $r_1$, $z_1$, and $z_2$, a superellipse expression provides optional bounds on the flowpath curve 1205 forward of the bulge. EQ. 7 for a superellipse relating the axial coordinate, z, to the radius, r, is given below:

$$\left(\frac{z-z_1}{z_2-z_1}\right)^p+\left(\frac{r}{r_1}\right)^q=1 \text{ or, equivalently, } \left(\frac{z/r_2-z_1/r_2}{z_2/r_2-z_1/r_2}\right)^p+\left(\frac{r/r_2}{r_1/r_2}\right)^q=1$$

Figure 23:
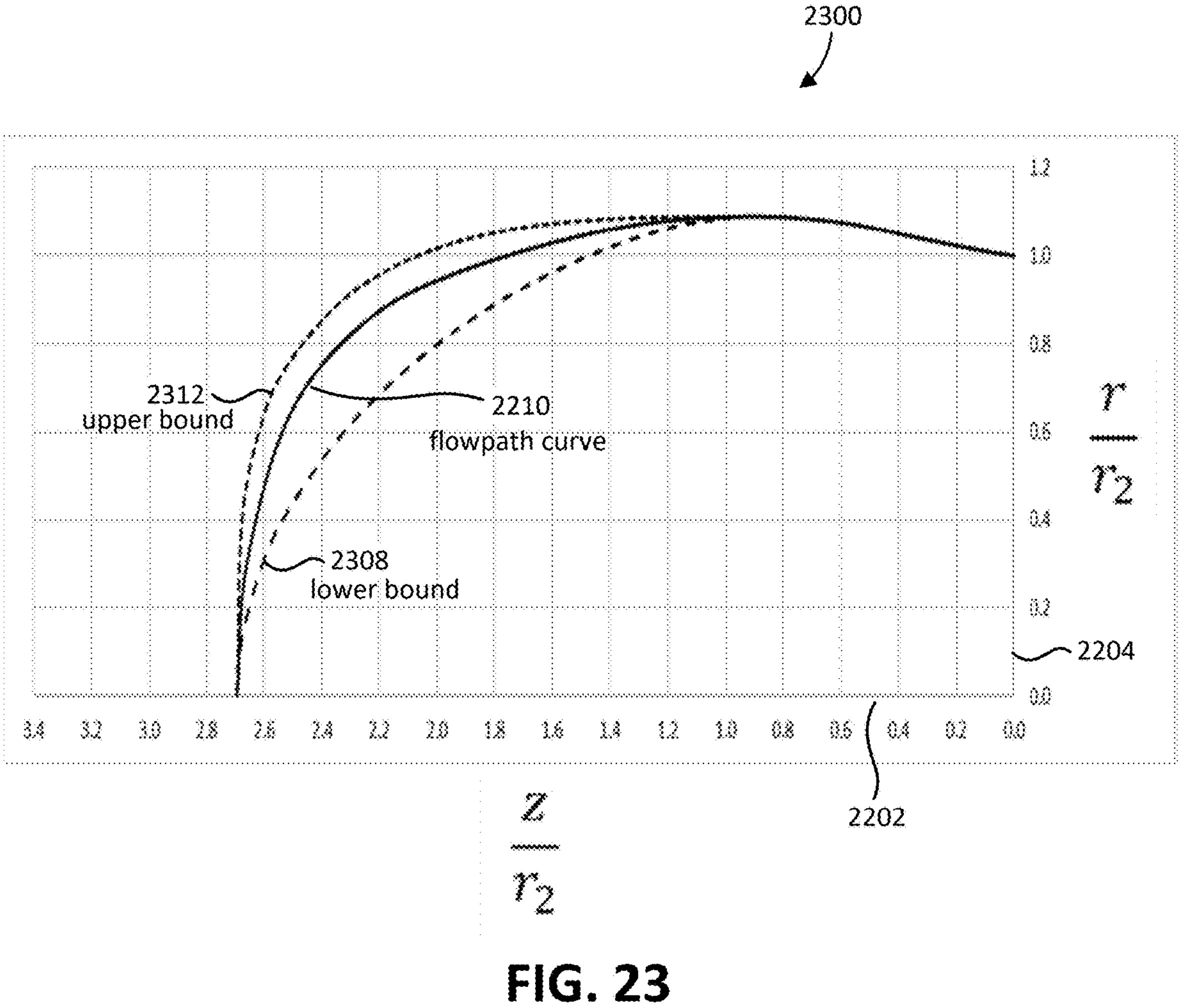
FIG. 23 is a chart depicting bounds on the shape of the forward housing of an unducted fan propulsor, according to some embodiments.

In EQ. 7, exponents p and q define a shape of a curve forward of the bulge for ratios $r_1/r_2$, $z_1/r_2$, and $z_2/r_2$ determined via EQS. 4, 5, and 6 as described above. FIG. 23 provides chart 2300 similar to chart 2200 in FIG. 22. Accordingly, X-Axis 2202 and Y-Axis 2204, and curve 2210 in chart 2300 are the same as in chart 2200. Curves 2308 and 2312 conform to the same ratios determined by EQS. 4, 5, and 6 as curve 210. However, curves 2308 and 2312 that bound the range of suitable points for flowpath curve 1205 are determined by using EQ. 7 via values of exponents p and q. Curve 2308, with exponents p=1.5 and q=2.0, forms a lower bound on suitable points for flowpath curve 1205 forward of the bulge. Curve 2312, with exponents p=3.0 and q=3.5 forms an upper bound of suitable points for flowpath curve 1205 forward of the bulge. Thus, within the axial range from the bulge to the forward-most end 1208 of the forward housing 1206, EQ. 7 with ranges on exponents p and q provides a band, or range, of points to define the shape of forward housing 1206. Curve 2210 agrees closely with EQ. 7 using exponents p=2.0 and q=3.0. Thus, options for the lower bound conform to exponent ranges $1.5<p<2.0$ and $2.0<q<3.0$ while options for the upper bound conform to exponents ranges $2.0<p<3.0$ and $3.0<q<3.5$. At least for some suppressed flight Mach numbers, $M_s$, for example 0.75 depicted as plot 2210, a low loss flowpath curve can be obtained within a more limited bounds such that the lower constraints on the flowpath curve are in the ranges $1.7<p<2.0$ and $2.5<q<3.0$ while the upper constraints on the flowpath curve are in the ranges $2.0<p<2.5$ and $3.0<q<3.3$.

In some configurations, the above spinner shape parameters may be particularly beneficial for a range of a dimensionless cruise fan net thrust parameter. In some configurations, the above spinner shape parameters associated with the predetermined flight speed may be particularly beneficial when designing spinner shapes. The thrust parameter is the same as defined earlier:

$$\frac{F_{net}}{\rho_0 V_0^2 A_{an}}.$$

The thrust parameter may be, greater than or equal to 0.060, (e.g., greater than 0.080, or is greater than 0.084).

It should be recognized that the forward housing 1206 or spinner need not be axisymmetric about the axis of rotation for the propeller. For example, at the axial location of the second radius proximal to the plurality of blades, the distance of the spinner or hub surface may vary in the circumferential direction to accommodate blade attachment or variable pitch mechanisms. As stated previously, for axial locations along forward housing 1206 that are rotating about the axis of rotation 1220, as the case with a spinner, the radius, such as the second radius, is defined as an "effective" radius of a circle having the same cross-sectional area of the spinner normal to the axis of rotation. Thus, the term "radius" used in the description and claims refers to the radius of a circle having the cross-sectional area of the spinner at that axial location. However, for a forward housing 1206 that is stationary, as could be the case for an unducted fan propulsor in which the forward blade assembly is stationary and the aft blade assembly is rotating, the flowpath curve 1205 corresponds to the intersection of the forward housing with a plane that includes the axis of rotation and the forward-most point of the forward blade root 1222. If the forward blade 1202 has variable pitch, then the forward-most point corresponds to the blade orientation that positions the forward-most point in its most forward position, likely approximately to the cruise or design point condition. In this case, the flowpath curve 1205 disclosed herein may correspond to one of the blade roots 1222, more than one blade root, or all the blade roots. In case the forward-most point of the forward blade root 1222 is not attached to the forward housing 1206, e.g., there is a clearance gap between the forward blade root 1222 and the forward housing 1206 to allow for pitch change or the forward blade 1202 is attached to the airframe and suspended over the forward housing 1206, then curve 1205 goes through the nearest point on the surface of the forward housing 1206 to the forward-most point of the forward blade root 1222.

In some embodiments, a rotating element for an unducted fan propulsor for propelling an aircraft comprises a plurality of blades affixed to a spinner, wherein the spinner is configured to rotate about an axis of rotation, wherein the spinner includes a first radius and a second radius, wherein the second radius is proximal to the plurality of blades and the first radius is forward from the second radius, wherein a ratio of the first radius to the second radius ranges from 1.021 to 1.192, and wherein the aircraft is configured to travel at a predetermined speed.

Figure 24:
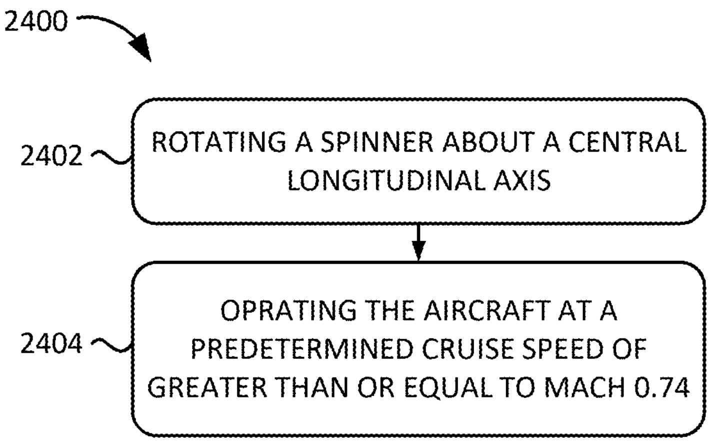
FIG. 24 is a flow chart of a method of operating an unducted fan propulsor, according to some embodiments.

In some embodiments, a rotating element for an unducted fan propulsor for propelling an aircraft comprises a plurality of blades affixed to a spinner, wherein the spinner is configured to rotate about an axis of rotation, wherein the flowpath curve on the spinner includes a first radius and a second radius, wherein the first radius is at the bulge or maximum radius forward of the associated plurality of blades, wherein the second radius is at the local minimum aft of the bulge, wherein a first distance is defined between the axial locations of the bulge and the local minimum, and wherein a second distance is defined between a forward-most end of the spinner and the axial location of the local minimum, wherein a ratio of the first radius to the second radius ranges from 1.021 to 1.192, wherein a ratio of the first distance to the second radius ranges from 0.543 to 1.522, wherein a ratio of the second distance to the second radius ranges from 1.523 to 4.115, wherein the aircraft is configured to travel at a predetermined speed. FIG. 24 is a flow chart of a method 2400 of operating an unducted fan propulsor for propelling an aircraft. The unducted fan propulsor includes a spinner and a plurality of blades affixed to the spinner. The method includes the steps of rotating 2402 the spinner about an axis of rotation and operating 2404 the aircraft at a predetermined speed of greater than or equal to suppressed Mach 0.70. The spinner may be configured as described herein with respect to FIGS. 12 and 13. For example, the spinner may include a first radius and a second radius, wherein the second radius is proximal to the plurality of blades and the first radius is forward from the second radius, wherein a ratio of the first radius to the second radius is greater than 1.021. Further, the ratio of the first radius to the second radius may be defined by EQ 4:

$$\frac{r_1}{r_2} = (A2 - 1)\frac{M_s - 0.60}{0.19} + 1,$$

wherein $r_1$ is the first radius, $r_2$ is the second radius, $M_s$ corresponds to a suppressed Mach number based on predetermined sustained high speed of the aircraft (such as cruise), and A2 is a value that ranges from 1.04 to 1.14.

Also, a first distance is defined between the axial location corresponding to the first radius and the axial location corresponding to the second radius, and the ratio of the first distance to the second radius is less than 1.522. Further, the ratio of the first distance to the second radius may be defined by EQ. 5:

$$\frac{z_1}{r_2} = B2\left(\frac{M_s}{0.79}\right)^3$$

wherein $z_1$ is the first distance, $r_2$ is the second radius, $M_s$ corresponds to a suppressed Mach number based on predetermined sustained high speed of the aircraft (such as cruise), and B2 is a value that ranges from 0.78 to 1.18.

Also, a second distance is defined between the forward-most end of the spinner and the axial location corresponding to the second radius, and the ratio of the second distance to the second radius is less than 4.115. Further the ratio of the second distance to the second radius may be defined by EQ. 6:

$$\frac{z_2}{r_2} = C2\left(\frac{M_s}{0.79}\right)^3$$

wherein $z_2$ is the second distance, $r_2$ is the second radius, $M_s$ corresponds to a suppressed Mach number based on predetermined sustained high speed of the aircraft (such as cruise), and C2 is a value that ranges from 2.19 to 3.19.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein 0.065<RL/D<1.98 and 0 is between 187° and 340°, and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0$$

In the preceding clause, 0.254<RL/D<1.86 and 0 is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0$$

In any of the two preceding clauses, 0.369<RL/D<1.43 and θ is between 204° and 291°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and 0 is between 187° and 342°.

In any of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 205° and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15>\frac{F_{net}}{\rho_0 V_0^2 A_{an}}>0.06,$$

wherein $F_{net}$ is cruise fan net thrust, po is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and 0 is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0$$

The aircraft of Clause 6, wherein 0.254<RL/D<1.86 and 0 is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0$$

and $$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of Clause 6, wherein 0.369<RL/D<1.43 and θ is between 204° and 291°, and the P of the unducted fan propulsor is defined by the following expressions:

$$\frac{RL}{D} + \frac{\left(\sqrt{0.09923*\left[0.2964*\sin^2(\theta) - 0.36*\cos^2(\theta) + 0.66*\sin(\theta)*\cos(\theta)\right]} + 0.3675*\sin(\theta) + 0.0891*\cos(\theta)\right)}{0.49*\sin^2(\theta) + 0.2025*\cos^2(\theta)} > 0$$

and $$\frac{RL}{D} + \frac{\left(-\sqrt{0.09923*\left[0.2964*\sin^2(\theta) - 0.36*\cos^2(\theta) + 0.66*\sin(\theta)*\cos(\theta)\right]} + 0.3675*\sin(\theta) + 0.0891*\cos(\theta)\right)}{0.49*\sin^2(\theta) + 0.2025*\cos^2(\theta)} < 0$$

The aircraft of Clause 6, wherein 0.477<RL/D<0.9455 and θ is between 211° and 274°, and the P of the unducted fan propulsor is defined by the following expressions:

$$\frac{RL}{D} + \frac{\left(\sqrt{0.01069156*\left[0.036*\sin^2(\theta) - 0.3485*\cos^2(\theta) + 0.5418*\sin(\theta)*\cos(\theta)\right]} + 0.139167*\sin(\theta) + 0.020812*\cos(\theta)\right)}{0.2209*\sin^2(\theta) + 0.0484*\cos^2(\theta)} > 0$$

and $$\frac{RL}{D} + \frac{\left(-\sqrt{0.01069156*\left[0.036*\sin^2(\theta) - 0.3485*\cos^2(\theta) + 0.5418*\sin(\theta)*\cos(\theta)\right]} + 0.139167*\sin(\theta) + 0.020812*\cos(\theta)\right)}{0.2209*\sin^2(\theta) + 0.0484*\cos^2(\theta)} < 0$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein θ is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, po is ambient air density, $V_0$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 1870 and 342.°.

The method of Clause 8, wherein 0.15≤RL/D.

The method of Clause 8, wherein 0.35≤RL/D, and preferably RL/D is about 0.72.

The method of Clause 8, wherein θ is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, po is ambient air density, $V_o$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising: a fuselage; a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein $0.07 \leq RL/D \leq 2.0$ and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

An unducted fan propulsor for an aircraft configured for high subsonic cruise comprising: an axis of rotation; a forward blade assembly comprised of a plurality of forward blades; an aft blade assembly comprised of a plurality of aft blades; a forward housing; an aft housing; wherein each forward blade and each aft blade comprises a blade root proximal to the axis of rotation and a blade tip distal from the axis of rotation; wherein a flowpath curve corresponds to an intersection of the aft housing external surface with a plane containing the axis of rotation and an aft-most point of an aft blade root; wherein for the flowpath curve, an axial direction, z, is parallel to the axis of rotation and radius, r, is distance from the axis of rotation; wherein a bulge location with radius $r_b$ on the flowpath curve is found by proceeding aft from the aft-most point on the aft blade root to where a first radius reaches a maximum; wherein a local minimum with radius $r_h$ on the flowpath curve is found by proceeding forward from the bulge location to a nearest point where a second radius stops decreasing within an axial extent of the aft blade root; and wherein ratio $r_b/r_h > 1.058$.

The unducted fan propulsor of any preceding clause wherein an axial distance $z_b$ is between the bulge location and the local minimum, and wherein ratio $z_b/r_h < 2.103$.

The unducted fan propulsor of any preceding clause wherein a location with radius $r_m$ is axially halfway between the bulge location and the local minimum, and wherein ratio $$\frac{r_m/r_h - 1}{r_b/r_h - 1} > 0.59.$$

The unducted fan propulsor of any preceding clause wherein the aircraft is configured for a suppressed flight Mach number $0.70 < M_s < 0.86$, and wherein $$\frac{r_b}{r_h} = (A1 - 1)\frac{M_s - 0.60}{0.19} + 1,$$

where $1.11 < A1 < 1.31$.

The unducted fan propulsor of any preceding clause wherein $$\frac{z_b}{r_h} = B1\left(\frac{M_s}{0.79}\right)^3,$$

where $1.23 < B1 < 1.63$.

The unducted fan propulsor of any preceding clause wherein $$\frac{r_m/r_h - 1}{r_b/r_h - 1} = 0.59,$$

where $0.59 < C1 < 0.79$.

The unducted fan propulsor of any preceding clause wherein $1.16 < A1 < 1.31$.

The unducted fan propulsor of any preceding clause wherein $1.23 < B1 < 1.53$.

The unducted fan propulsor of any preceding clause wherein $0.64 < C1 < 0.79$.

The unducted fan propulsor of any preceding clause wherein $1.16 < A1 < 1.26$.

The unducted fan propulsor of any preceding clause wherein $1.33 < B1 < 1.53$.

The unducted fan propulsor of any preceding clause wherein $0.64 < C1 < 0.74$.

The unducted fan propulsor of any preceding clause wherein the aircraft is configured for dimensionless cruise thrust parameter, $$\frac{F_{net}}{\rho_0 V_0^2 A_{an}},$$

here at cruise operation:

(i) $F_{net}$ is fan net thrust, (ii) $\rho_0$ is ambient air density, (iii) $V_0$ is flight velocity, (iv) $A_{an}$ is fan stream tube annular area entering a fan; and (v)

$$\frac{F_{net}}{\rho_0 V_0^2 A_{an}} > 0.060.$$

The unducted fan propulsor of any preceding clause wherein $$\frac{F_{net}}{\rho_0 V_0^2 A_{an}} > 0.080.$$

The unducted fan propulsor of any preceding clause wherein the forward blade assembly and the forward housing rotate about the axis of rotation, and wherein the aft blade assembly and the aft housing are stationary.

The unducted fan propulsor of any preceding clause wherein the flowpath curve further corresponds to respective aft-most points of two or more aft blade roots.

The unducted fan propulsor of any preceding clause wherein the flowpath curve further corresponds to respective aft-most points of at least half of the aft blade roots.

The unducted fan propulsor of any preceding clause wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted fan propulsor of any preceding clause wherein the forward blade assembly and the forward housing are stationary, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted fan propulsor of any preceding clause wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

The unducted fan propulsor of any preceding clause wherein a number of blades in the forward blade assembly is between 8 and 18.

The unducted fan propulsor of any preceding clause wherein a difference between the number of blades in the forward blade assembly to the number of blades in the aft blade assembly is between 2 and −2.

The unducted fan propulsor of any preceding clause wherein ratio $r_b/r_h > 1.084$.

The unducted fan propulsor of any preceding clause wherein axial distance $z_b$ is between the bulge location and the local minimum, and wherein ratio $z_b/r_h < 1.974$.

The unducted fan propulsor of any preceding clause wherein a location with radius $r_m$ is axially halfway between the bulge location and the local minimum, and wherein ratio $$\frac{r_m/r_h - 1}{r_b/r_h - 1} > 0.64.$$

The unducted fan propulsor of any preceding clause wherein ratio $r_b/r_h < 1.424$.

An unducted fan propulsor for an aircraft configured for high subsonic cruise comprising: an axis of rotation; a forward blade assembly comprised of a plurality of forward blades; an aft blade assembly comprised of a plurality of aft blades; a forward housing; an aft housing; wherein for each forward blade and each aft blade comprises a blade root proximal to the axis of rotation and a blade tip distal from the axis of rotation; wherein a flowpath curve corresponds to an intersection of the forward housing's external surface with a plane containing the axis of rotation and a forward-most point of a forward blade root; wherein for the flowpath curve, an axial direction, z, is parallel to the axis of rotation and radius, r, is a first distance from the axis of rotation; wherein a bulge location with radius $r_1$ on the flowpath curve is found by proceeding forward from the forward-most point on the forward blade root to where a first radius reaches a maximum; wherein a local minimum with radius $r_2$ on the flowpath curve is found by proceeding aft from the bulge location to a nearest point where a second radius stops decreasing within an axial extent of the forward blade root, and wherein ratio $r_1/r_2 > 1.021$.

The unducted fan propulsor of any preceding clause wherein an axial distance $z_1$ is between the bulge location and the local minimum, and wherein ratio $z_1/r_2 < 1.522$.

The unducted fan propulsor of any preceding clause wherein an axial distance $z_2$ is between a forward-most end of the forward housing and the local minimum, and wherein ratio $z_2/r_2 < 4.115$.

The unducted fan propulsor of any preceding clause wherein the aircraft is configured for a suppressed flight Mach number $0.70 < M_s < 0.86$, and wherein $$\frac{r_1}{r_2} = (A2 - 1)\frac{M_s - 0.60}{0.19} + 1,$$

where $1.04 < A2 < 1.14$.

The unducted fan propulsor of any preceding clause wherein $$\frac{z_1}{r_2} = B2\left(\frac{M_s}{0.79}\right)^3,$$

where $0.78 < B2 < 1.18$.

The unducted fan propulsor of any preceding clause wherein $$\frac{z_2}{r_2} = C2\left(\frac{M_s}{0.79}\right)^3,$$

where $2.19 < C2 < 3.19$.

The unducted fan propulsor of any preceding clause wherein $1.06 < A2 < 1.14$.

The unducted fan propulsor of any preceding clause wherein $0.78 < B2 < 1.08$.

The unducted fan propulsor of any preceding clause wherein $2.19 < C2 < 2.99$.

The unducted fan propulsor of any preceding clause wherein $1.06 < A2 < 1.12$.

The unducted fan propulsor of any preceding clause wherein $0.88 < B2 < 1.08$.

The unducted fan propulsor of any preceding clause wherein $2.39 < C2 < 2.99$.

The unducted fan propulsor of any preceding clause wherein the aircraft is configured for dimensionless cruise thrust parameter, $$\frac{F_{net}}{\rho_0 V_0^2 A_{an}},$$

where at cruise operation:

(i) $F_{net}$ is fan net thrust, (ii) $\rho_0$ is ambient air density, (iii) $V_0$ is flight velocity, (iv) $A_{an}$ is fan stream tube annular area entering a fan, and (v)

$$\frac{F_{net}}{\rho_0 V_0^2 A_{an}} > 0.060.$$

The unducted fan propulsor of any preceding clause wherein $$\frac{F_{net}}{\rho_0 V_0^2 A_{an}} > 0.080.$$

The unducted fan propulsor of any preceding clause wherein the forward blade assembly and the forward housing are stationary, and wherein the aft blade assembly and a portion of the aft housing to which the plurality of aft blades are attached rotate about the axis of rotation.

The unducted fan propulsor of any preceding clause wherein the flowpath curve further corresponds to respective forward-most points of two or more forward blade roots.

The unducted fan propulsor of any preceding clause wherein the flowpath curve further corresponds to respective forward-most points of at least half of forward blade roots.

The unducted fan propulsor of any preceding clause wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the forward housing is rotating is an effective radius that is a fourth radius of a circle having the same cross-sectional area perpendicular to the axis of rotation at that axial location.

The unducted fan propulsor of any preceding clause wherein the forward blade assembly and the forward housing rotate about the axis of rotation, wherein the aft blade assembly and the aft housing are stationary, and wherein a third radius at a given axial location for which the forward housing is rotating is an effective radius that is a fourth radius of a circle having the same cross-sectional area perpendicular to the axis of rotation at that axial location.

The unducted fan propulsor of any preceding clause wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

The unducted fan propulsor of any preceding clause wherein the number of blades in the forward blade assembly is between 8 and 18.

The unducted fan propulsor of any preceding clause wherein a difference between the number of blades in the forward blade assembly to the number of blades in the aft blade assembly is between 2 and −2.

The unducted fan propulsor of any preceding clause wherein ratio $r_1/r_2>1.032$.

The unducted fan propulsor of any preceding clause wherein an axial distance $z_1$ is between the bulge location and the local minimum, and wherein ratio $z_1/r_2<1.393$.

The unducted fan propulsor of any preceding clause wherein an axial distance $z_2$ is between a forward-most end of the forward housing and the local minimum, and wherein ratio $z_2/r_2<3.857$.

The unducted fan propulsor of any preceding clause wherein a span is a second distance between the blade root and the blade tip, wherein the plurality of forward blades in the forward blade assembly are oriented for cruise operation, wherein the plurality of forward blades in the forward blade assembly have a maximum axial width near mid-span, and wherein θ to 40 percent of the maximum axial width is located forward of the forward-most point of forward blade roots.

The unducted fan propulsor of any preceding clause wherein a flowpath curve (z, r) coordinate system has origin at axial location of the local minimum with axial coordinate, z, increasing in a forward direction, wherein a curve forward of bulge ($z>z_1$) lies within lower and upper bounds defined by $$\left(\frac{z-z_1}{z_2-z_1}\right)^p + \left(\frac{r}{r_2}\right)^q = 1,$$

wherein a lower bound has exponents $1.5<p<2.0$ and $2.0<q<3.0$, and wherein an upper bound has exponents $2.0<p<3.0$ and $3.0<q<3.5$.

The unducted fan propulsor of any preceding clause wherein the lower bound has exponents $1.7<p<2.0$ and $2.3<q<3.0$, and wherein the upper bound has exponents $2.0<p<2.5$ and $3.0<q<3.3$.

An unducted fan propulsor for an aircraft configured for high subsonic cruise comprising: an axis of rotation; a forward blade assembly comprised of a plurality of forward blades; a forward housing; wherein for each blade comprises a blade root proximal to the axis of rotation and a blade tip distal from the axis of rotation; wherein a flowpath curve corresponds to an intersection of the forward housing's external surface with a plane containing the axis of rotation and a forward-most point of a forward blade root; wherein for the flowpath curve, an axial direction, z, is parallel to the axis of rotation and radius, r, is a distance from the axis of rotation; wherein a bulge location with radius $r_1$ on the flowpath curve is found by proceeding forward from the forward-most point on the forward blade root to where a first radius reaches a maximum; wherein a local minimum with radius $r_2$ on the flowpath curve is found by proceeding aft from the bulge location to a nearest point where a second radius stops decreasing, and wherein ratio $r_1/r_2>1.047$.

The unducted fan propulsor of any preceding clause wherein an axial distance $z_1$ is between the bulge location and the local minimum, and wherein ratio $z_1/r_2<1.522$.

The unducted fan propulsor of any preceding clause wherein an axial distance $z_2$ is between a forward-most end of the forward housing and the local minimum, and wherein ratio $z_2/r_2<4.115$.

An unducted fan propulsor for an aircraft configured for high subsonic cruise comprising: an axis of rotation; a forward blade assembly comprised of a plurality of forward blades; an aft blade assembly comprised of a plurality of aft blades; a forward housing; an aft housing; wherein each forward blade and each aft blade comprises a blade root proximal to the axis of rotation and a blade tip distal from the axis of rotation; wherein a flowpath curve corresponds to an intersection of the aft housing's external surface with a plane containing the axis of rotation and an aft-most point of an aft blade root; wherein for the flowpath curve, an axial direction, z, is parallel to the axis of rotation and radius, r, is distance from the axis of rotation; wherein a bulge location with radius $r_b$ on the flowpath curve is found by proceeding aft from the aft-most point on the aft blade root to where a first radius reaches a maximum; wherein a local minimum with radius $r_h$ on the flowpath curve is found by proceeding forward from the bulge location to a nearest point where a second radius stops decreasing within an axial extent of the aft blade root; and wherein ratio $r_b/r_h>1.058$.

The unducted fan propulsor of any preceding clause, wherein an axial distance $z_b$ is between the bulge location and the local minimum, and wherein ratio $z_b/r_h<2.103$.

The unducted fan propulsor of any preceding clause wherein a location with radius $r_m$ is axially halfway between the bulge location and the local minimum, and wherein ratio $$\frac{r_m/r_h - 1}{r_b/r_h - 1} > 0.59.$$

The unducted fan propulsor of any preceding clause wherein the aircraft is configured for a suppressed flight Mach number $0.70<M_s<0.86$, and wherein $$\frac{r_b}{r_h} = (A1 - 1)\frac{M_s - 0.60}{0.19} + 1,$$

where $1.11<A1<1.31$.

The unducted fan propulsor of any preceding clause wherein $$\frac{z_b}{r_h} = B1\left(\frac{M_s}{0.79}\right)^3,$$

where $1.23<B1<1.63$.

The unducted fan propulsor of any preceding clause wherein $$\frac{r_m/r_h - 1}{r_b/r_h - 1} = 0.59,$$

where $0.59<C1<0.79$.

The unducted fan propulsor of any preceding clause wherein $1.16<A1<1.31$. The unducted fan propulsor of any preceding clause wherein $1.23<B1<1.53$.

The unducted fan propulsor of any preceding clause wherein $0.64<C1<0.79$.

The unducted fan propulsor of any preceding clause wherein $1.16<A1<1.26$.

The unducted fan propulsor of any preceding clause wherein $1.33<B1<1.53$.

The unducted fan propulsor of any preceding clause wherein $0.64<C1<0.74$.

The unducted fan propulsor of any preceding clause wherein the aircraft is configured for dimensionless cruise thrust parameter, $$\frac{F_{net}}{\rho_0 V_0^2 A_{an}},$$

where at cruise operation:

(i) $F_{net}$ is fan net thrust, (ii) $\rho_0$ is ambient air density, (iii) $V_0$ is flight velocity, (iv) $A_{an}$ is fan stream tube annular area entering a fan; and (v)

$$\frac{F_{net}}{\rho_0 V_0^2 A_{an}} > 0.060.$$

The unducted fan propulsor of any preceding clause wherein $$\frac{F_{net}}{\rho_0 V_0^2 A_{an}} > 0.080.$$

The unducted fan propulsor of any preceding clause wherein the forward blade assembly and the forward housing rotate about the axis of rotation, and wherein the aft blade assembly and the aft housing are stationary.

The unducted fan propulsor of any preceding clause wherein the flowpath curve further corresponds to respective aft-most points of two or more aft blade roots.

The unducted fan propulsor of any preceding clause wherein the flowpath curve further corresponds to respective aft-most points of at least half of the aft blade roots.

The unducted fan propulsor of any preceding clause wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted fan propulsor of any preceding clause wherein the forward blade assembly and the forward housing are stationary, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted fan propulsor of any preceding clause wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

The unducted fan propulsor of any preceding clause wherein a number of blades in the forward blade assembly is between 8 and 18.

The unducted fan propulsor of any preceding clause wherein a difference between the number of blades in the forward blade assembly to the number of blades in the aft blade assembly is between 2 and −2.

The unducted fan propulsor of any preceding clause wherein ratio $r_b/r_h>1.084$.

The unducted fan propulsor of any preceding clause wherein axial distance $z_b$ is between the bulge location and the local minimum, and wherein ratio $z_b/r_h<1.974$.

The unducted fan propulsor of any preceding clause wherein a location with radius $r_m$ is axially halfway between the bulge location and the local minimum, and wherein ratio $$\frac{r_m/r_h-1}{r_b/r_h-1}>0.64.$$

The unducted fan propulsor of any preceding clause wherein ratio $r_b/r_h<1.424$.

An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC; a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein $0.07\leq RL/D\leq 2.0$ and 6 is between 187° and 342°; and wherein at least one of the two or more unducted fan propulsors further includes: an aft housing; a flowpath curve corresponding to an intersection of the aft housing's external surface with a plane that includes the CL and an aft-most point of an aft blade root of a blade of the rearward array of blades; an aft bulge location with a radius $r_b$ on the flowpath curve found by proceeding aft from the aft-most point of the aft root blade to where a first radius of the aft housing's external surface from the CL reaches a maximum; an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

The aircraft of the preceding clause, wherein an axial distance $z_b$ is between the aft bulge location and the aft local minimum, and wherein ratio $z_b/r_h<2.103$.

The aircraft of any of the two preceding clauses, wherein a location with radius $r_m$ is axially halfway between the aft bulge location and the aft local minimum, and wherein ratio $(r_m/r_h-1)/(r_b/r_h-1)>0.59$.

The aircraft of any of the three preceding clauses, wherein θ is between 198° and 310°, and preferably between 205° and 285°.

The aircraft of any of the four preceding clauses, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

The aircraft of any of the five preceding clauses, wherein the aircraft is configured for a suppressed Mach number $0.70<M_s<0.86$, and wherein the $r_b/r_h=(A1-1)(M_s-0.60)/0.19+1$, where $1.11<A1<1.31$.

The aircraft of any of the six preceding clauses, wherein the unducted fan propulsor is undermounted to the airfoil with one or more intermediate structures.

The aircraft of any of the seven preceding clauses, wherein the P of the unducted fan propulsor is variable to accommodate different operating conditions.

An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein at least one of the two or more unducted fan propulsors further includes: an aft housing; a flowpath curve corresponding to an intersection of the aft housing's external surface with a plane that includes the CL and an aft-most point of an aft blade root of a blade of the rearward array of blades; an aft bulge location with a radius $r_b$ on the flowpath curve found by proceeding aft from the aft-most point of the aft root blade to where a first radius of the aft housing's external surface from the CL reaches a maximum; an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

The aircraft of the preceding clause, wherein an axial distance $z_b$ is between the aft bulge location and the aft local minimum, and wherein ratio $z_b/r_h<2.103$.

The aircraft of any of the two preceding clauses, wherein a location with radius $r_m$ is axially halfway between the aft bulge location and the aft local minimum, and wherein ratio $(r_m/r_h-1)/(r_b/r_h-1)>0.59$.

The aircraft of any of the three preceding clauses, wherein the aircraft is configured for a suppressed Mach number $0.70<M_s<0.86$, and wherein the $r_b/r_h=(A1-1)(M_s-0.60)/0.19+1$, where $1.11<A1<1.31$.

An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D} + \frac{\left(\sqrt{\frac{1.4161*\left[1.88978*\sin^2(\theta)-0.0875*\cos^2(\theta)+0.477*\sin(\theta)*\cos(\theta)\right]}{}} + 1.764*\sin(\theta)+0.19146*\cos(\theta)\right)}{1.96*\sin^2(\theta)+0.7225*\cos^2(\theta)} > 0$$

and $$\frac{RL}{D} + \frac{\left(-\sqrt{\frac{1.4161*\left[1.88978*\sin^2(\theta)-0.0875*\cos^2(\theta)+0.477*\sin(\theta)*\cos(\theta)\right]}{}} + 1.764*\sin(\theta)+0.19146*\cos(\theta)\right)}{1.96*\sin^2(\theta)+0.7225*\cos^2(\theta)} < 0;$$

and wherein at least one of the two or more unducted fan propulsors further includes: an aft housing; a flowpath curve corresponding to an intersection of the aft housing's external surface with a plane that includes the CL and an aft-most point of an aft blade root of a blade of the rearward array of blades; an aft bulge location with a radius $r_b$ on the flowpath curve found by proceeding aft from the aft-most point of the aft root blade to where a first radius of the aft housing's external surface from the CL reaches a maximum; an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°; and wherein at least one of the two or more unducted fan propulsors further includes:

an aft housing;

a flowpath curve corresponding to an intersection of the aft housing's external surface with a plane that includes the CL and an aft-most point of an aft blade root of a blade of the rearward array of blades;

an aft bulge location with a radius $r_b$ on the flowpath curve found by proceeding aft from the aft-most point of the aft root blade to where a first radius of the aft housing's external surface from the CL reaches a maximum; and an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

2. The aircraft of claim 1, wherein an axial distance $z_b$ is between the aft bulge location and the aft local minimum, and wherein ratio $z_b/r_h<2.103$.

3. The aircraft of claim 1, wherein a location with radius $r_m$ is axially halfway between the aft bulge location and the aft local minimum, and wherein ratio $(r_m/r_h-1)/(r_b/r_h-1)>0.59$.

4. The aircraft of claim 1, wherein θ is between 198° and 310°, and preferably between 205° and 285°.

5. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

6. The aircraft of claim 1, wherein the aircraft is configured for a suppressed Mach number $0.70<M_s<0.86$, and wherein the $r_b/r_h=(A1-1)(M_s-0.60)/0.19+1$, where $1.11<A1<1.31$.

7. The aircraft of claim 1, wherein the unducted fan propulsor is undermounted to the airfoil with one or more intermediate structures.

8. The aircraft of claim 1, wherein the P of the unducted fan propulsor is variable to accommodate different operating conditions.

9. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position;

wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein at least one of the two or more unducted fan propulsors further includes:

an aft housing;

a flowpath curve corresponding to an intersection of the aft housing's external surface with a plane that includes the CL and an aft-most point of an aft blade root of a blade of the rearward array of blades;

an aft bulge location with a radius $r_b$ on the flowpath curve found by proceeding aft from the aft-most point of the aft root blade to where a first radius of the aft housing's external surface from the CL reaches a maximum; and an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

10. The aircraft of claim 9, wherein an axial distance $z_b$ is between the aft bulge location and the aft local minimum, and wherein ratio $z_b/r_h<2.103$.

11. The aircraft of claim 9, wherein a location with radius $r_m$ is axially halfway between the aft bulge location and the aft local minimum, and wherein ratio $(r_m/r_h-1)/(r_b/r_h-1)>0.59$.

12. The aircraft of claim 9, wherein the aircraft is configured for a suppressed Mach number $0.70<M_s<0.86$, and wherein the $r_b/r_h=(A1-1)(M_s-0.60)/0.19+1$, where $1.11<A1<1.31$.

13. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and 0 is between 187° and 340°; and wherein RL/D and θ of the P of the unducted fan propulsor adhere to the following expressions:

$$\frac{RL}{D}+\frac{\left(\sqrt{\frac{1.4161*\left[1.88978*\sin^2(\theta)-0.0875*\cos^2(\theta)+0.477*\sin(\theta)*\cos(\theta)\right]}{}}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0;$$

and wherein at least one of the two or more unducted fan propulsors further includes:

an aft housing;

a flowpath curve corresponding to an intersection of the aft housing's external surface with a plane that includes the CL and an aft-most point of an aft blade root of a blade of the rearward array of blades;

an aft bulge location with a radius $r_b$ on the flowpath curve found by proceeding aft from the aft-most point of the aft root blade to where a first radius of the aft housing's external surface from the CL reaches a maximum; and an aft local minimum with a radius $r_h$ on the flowpath curve found by proceeding forward from the aft bulge location to a nearest point where a second radius of the aft housing's external surface from the CL stops decreasing, wherein $r_b/r_h>1.058$.

* * * * *